(12) United States Patent
Taniguchi

(10) Patent No.: US 12,507,999 B2
(45) Date of Patent: Dec. 30, 2025

(54) DIAGNOSTIC ULTRASOUND APPARATUS AND COMPUTER READABLE STORAGE MEDIUM

(71) Applicant: Konica Minolta, Inc., Tokyo (JP)

(72) Inventor: Tetsuya Taniguchi, Hachioji (JP)

(73) Assignee: KONICA MINOLTA, INC., Tokyo (JP)

(*) Notice: Subject to any disclaimer, the term of this patent is extended or adjusted under 35 U.S.C. 154(b) by 632 days.

(21) Appl. No.: 17/180,160

(22) Filed: Feb. 19, 2021

(65) Prior Publication Data

US 2021/0275148 A1    Sep. 9, 2021

(30) Foreign Application Priority Data

Mar. 9, 2020 (JP) .................................. 2020-039480

(51) Int. Cl.
*A61B 8/08* (2006.01)
*A61B 8/00* (2006.01)

(52) U.S. Cl.
CPC .............. *A61B 8/5223* (2013.01); *A61B 8/08* (2013.01)

(58) Field of Classification Search
CPC ....... A61B 8/5223; A61B 8/08; A61B 8/5207; A61B 8/54; A61B 8/4405; A61B 8/5246; G01S 7/52047; G01S 15/8977; G01S 15/8954; G06T 2207/10132; G06T 5/00; G06T 7/10; G06T 7/20; G06T 7/30; G06T 7/60; G06T 7/70; G06T 11/003
See application file for complete search history.

(56) References Cited

U.S. PATENT DOCUMENTS

| 2012/0328135 A1* | 12/2012 | De Bruijn | H04R 3/12 381/98 |
| 2013/0137986 A1* | 5/2013 | Takeda | G01S 15/8963 600/447 |
| 2015/0018681 A1* | 1/2015 | Nishihara | A61B 8/5207 600/443 |
| 2015/0289849 A1* | 10/2015 | Taniguchi | G01S 7/52038 600/443 |
| 2017/0150948 A1* | 6/2017 | Kanayama | A61B 8/488 |
| 2019/0142386 A1* | 5/2019 | Srinivasan | A61B 8/5207 600/437 |

FOREIGN PATENT DOCUMENTS

| JP | 2006-051229 A | 2/2006 |
| JP | 2006-204594 A | 8/2006 |
| JP | 2013-111301 A | 6/2013 |

OTHER PUBLICATIONS

Office Action dated Jun. 27, 2023 issued in the related Japanese Application No. 2020-039480, with English translation.

* cited by examiner

*Primary Examiner* — Dixomara Vargas
(74) *Attorney, Agent, or Firm* — LUCAS & MERCANTI, LLP

(57) ABSTRACT

A diagnostic ultrasound apparatus includes a sound ray signal generator, an extractor and an arithmetic unit. The sound ray signal generator generates a sound ray signal based on a reception signal obtained from an ultrasound probe. The ultrasound probe transmits and receives ultrasound to and from a subject. The extractor extracts imaging signals from the sound ray signal by performing filtering of passing different bands. The arithmetic unit generates a difference signal by using the imaging signals, and performs an arithmetic operation on at least one of the imaging signals by using the difference signal.

17 Claims, 10 Drawing Sheets

DIAGNOSTIC ULTRASOUND APPARATUS AND COMPUTER READABLE STORAGE MEDIUM

CROSS-REFERENCE TO RELATED APPLICATIONS

The entire disclosure of Japanese Patent Application No. 2020-039480 filed on Mar. 9, 2020 is incorporated herein by reference in its entirety.

BACKGROUND

Technological Field

The present disclosure relates to a diagnostic ultrasound apparatus and a computer readable storage medium.

Description of the Related Art

An ultrasound (ultrasonography) can be performed repeatedly because it produces an ultrasound image showing the state of a heart or a fetus by a simple operation of applying an ultrasound probe to the body surface or the body cavity of a subject of a patient and has high safety. A diagnostic ultrasound apparatus used for such ultrasounds is known.

An ultrasound image usually displays echo signal components of reflected ultrasound (echo) obtained by ultrasound being reflected by structures larger than the ultrasound wavelength and echo signal components obtained by ultrasound being scattered by structures smaller than the ultrasound wavelength indistinguishably from each other. Reflector echo signals by reflectors larger than the ultrasound wavelength are signals corresponding to the morphologies/structures of the reflectors and obtained as the morphologies thereof directly. In contrast, scatterer echo signals by scatterers smaller than the ultrasound wavelength do not directly reflect the morphologies of the scatterers because they are smaller than the ultrasound wavelength.

However, scatterer echo signals are results of scattering and interference derived from tissues, and observed as so-called speckles in parenchymal regions, such as liver and thyroid gland, and their uniformity, graininess and so forth are utilized as pieces of diagnostic information.

Further, there is known a technique for obtaining a targeted ultrasound image by adding up ultrasound images. For example, there is known an image processing apparatus that calculates a weighting coefficient according to pixel value change information indicating an absolute value being larger as spatial change of sampling data obtained by a diagnostic ultrasound apparatus is larger, and adds up the sampling data and a smoothed image of the sampling data by using the weighting coefficient. (See JP 2006-51229 A). This image processing apparatus surely removes or reduces image noise centering on high-frequency components, ensures information on regions that are important in observation and contain many high-frequency components, such as boundaries of structures on the image, and reduces speckle noise.

There is also known a diagnostic ultrasound apparatus that extracts frequency components from a reception signal obtained by receiving ultrasound, generates multiple types of image data based on intensity changes of the frequency components, performs spatial filtering on at least one type of the image data, and combines the multiple types of the image data. (See JP 2006-204594 A). With this combined image data, the diagnostic ultrasound apparatus highlights a tissue of a living body by utilizing difference in frequency pass characteristics of tissues of a living body.

SUMMARY

Although the image processing apparatus of JP 2006-51229 A can keep edge resolution of structures having high signal intensity, such as organ edges, it smooths, like speckles, tissue structures having a small difference in signal intensity from their surroundings, such as microstructures in organs and in tumors, and impairs the resolution.

Further, although the diagnostic ultrasound apparatus of JP 2006-204594 A can produce the information based on the difference in the frequency characteristics of tissues, it cannot have high resolution because images are composed of signals of a narrow band centering on an inevitably selected frequency.

Objects of the present disclosure include drawing echo components of a tissue(s) (reflectors, reflection components) based on reflection of ultrasound with high resolution even when the subject has many scatterers (scatter components) in a tissue(s), and also suppressing scattered acoustic noise due to high-frequency ultrasound signals, which are susceptible to scattering, thereby obtaining both high resolution and tissue recognition.

In order to achieve at least one of the abovementioned objects, according to a first aspect of the present disclosure, there is provided a diagnostic ultrasound apparatus including:

a sound ray signal generator that generates a sound ray signal based on a reception signal obtained from an ultrasound probe that transmits and receives ultrasound to and from a subject;

an extractor that extracts imaging signals from the sound ray signal by performing filtering of passing different bands, and an arithmetic unit that generates a difference signal by using the imaging signals, and performs an arithmetic operation on at least one of the imaging signals by using the difference signal.

In order to achieve at least one of the abovementioned objects, according to a second aspect of the present disclosure, there is provided a non-transitory computer readable storage medium storing a program that causes a computer to:

generate a sound ray signal based on a reception signal obtained from an ultrasound probe that transmits and receives ultrasound to and from a subject;

extract imaging signals from the sound ray signal by performing filtering of passing different bands, and generate a difference signal by using the imaging signals, and perform an arithmetic operation on at least one of the imaging signals by using the difference signal.

BRIEF DESCRIPTION OF DRAWINGS

The advantages and features provided by one or more embodiments of the present invention will become more fully understood from the detailed description given hereinbelow and the appended drawings that are given by way of illustration only, and thus are not intended as a definition of the limits of the present invention, wherein.

DETAILED DESCRIPTION OF EMBODIMENTS

Hereinafter, a first embodiment, an example and a second embodiment of the present invention will be described in this order in detail with reference to the appended drawings. However, the scope of the present invention is not limited to the disclosed or illustrated embodiments or the like.

First Embodiment

Figure 1:
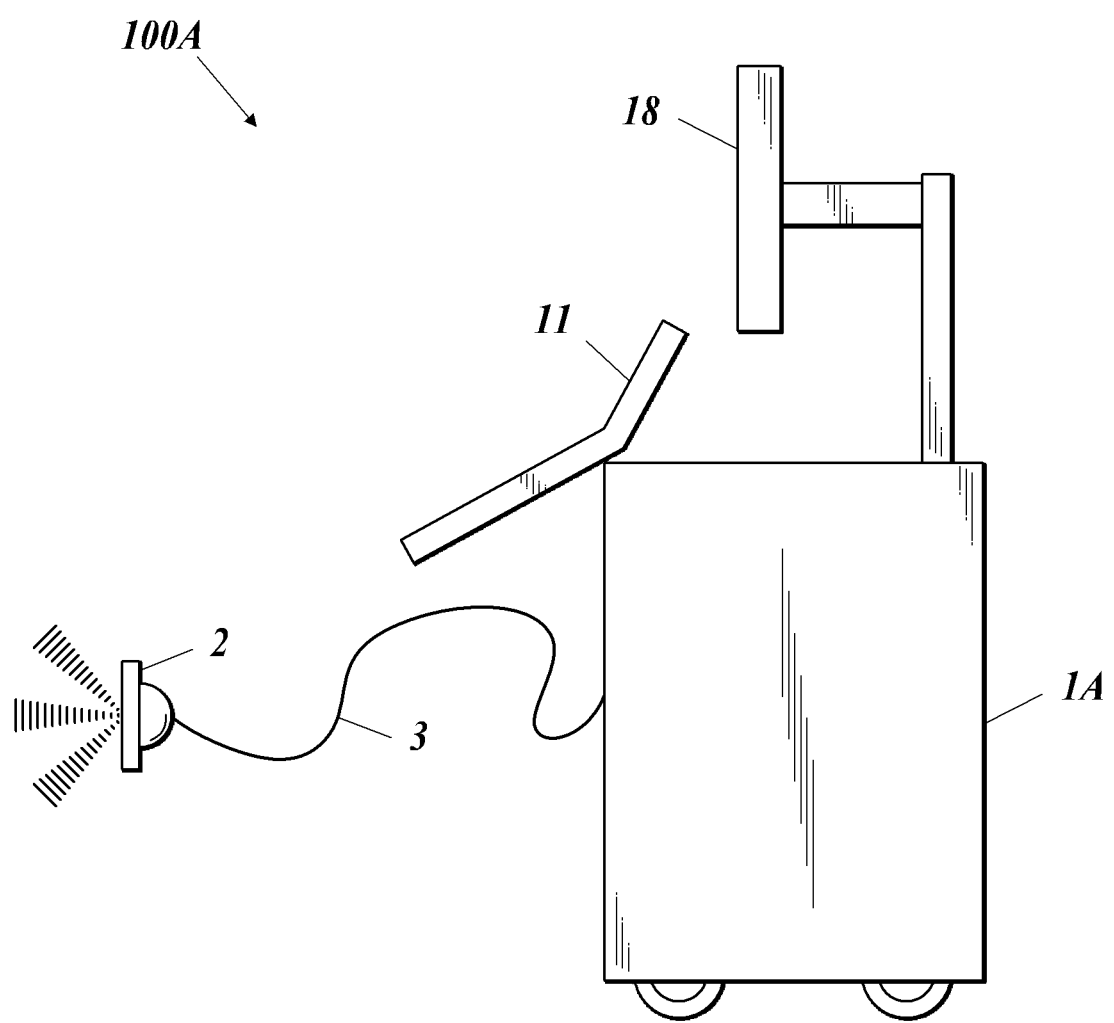
FIG. 1 shows the external configuration of a diagnostic ultrasound apparatus according to a first embodiment of the present disclosure.
Figure 2:
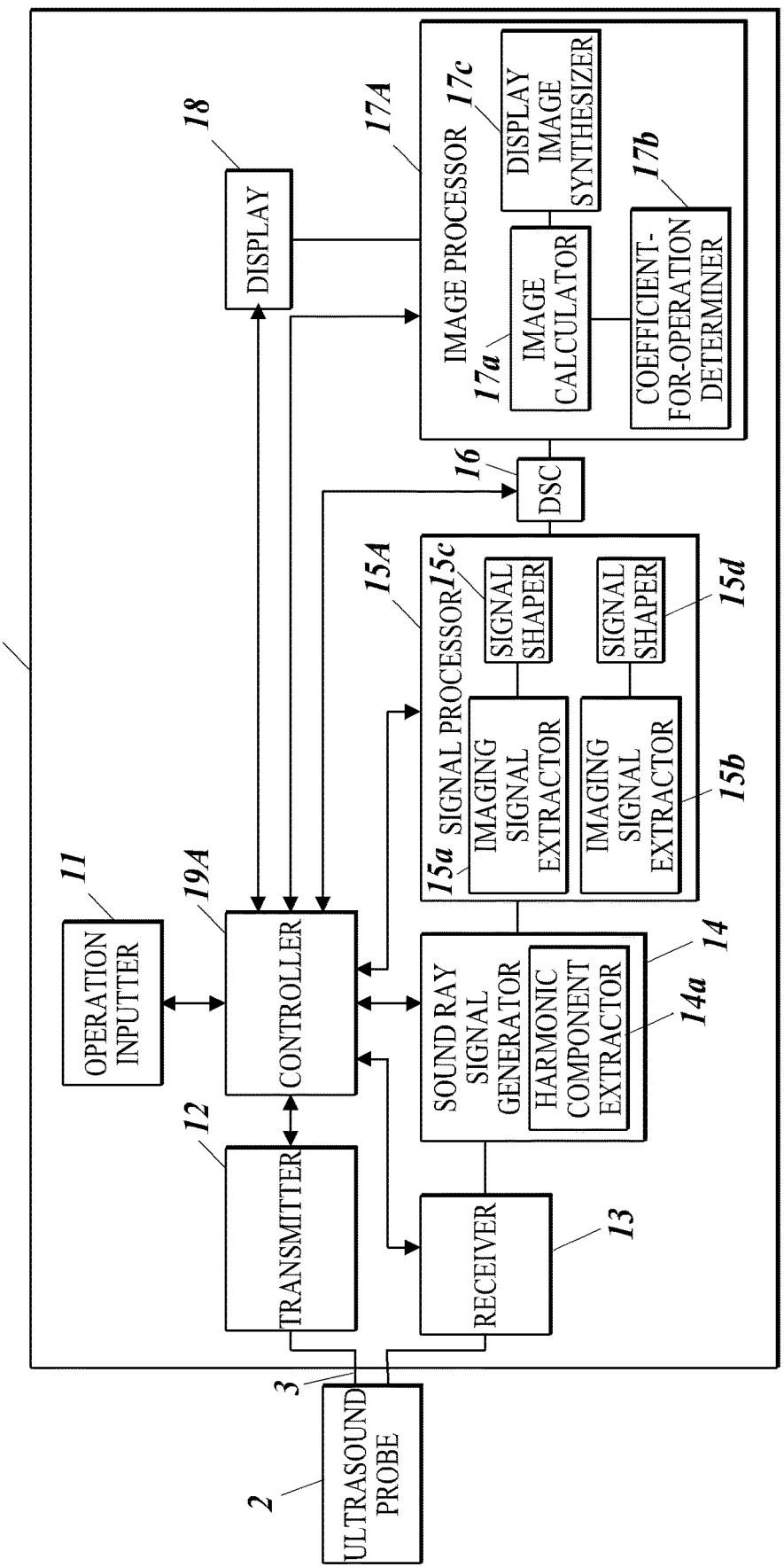
FIG. 2 is a block diagram showing the functional configuration of the diagnostic ultrasound apparatus according to the first embodiment.
Figure 3:
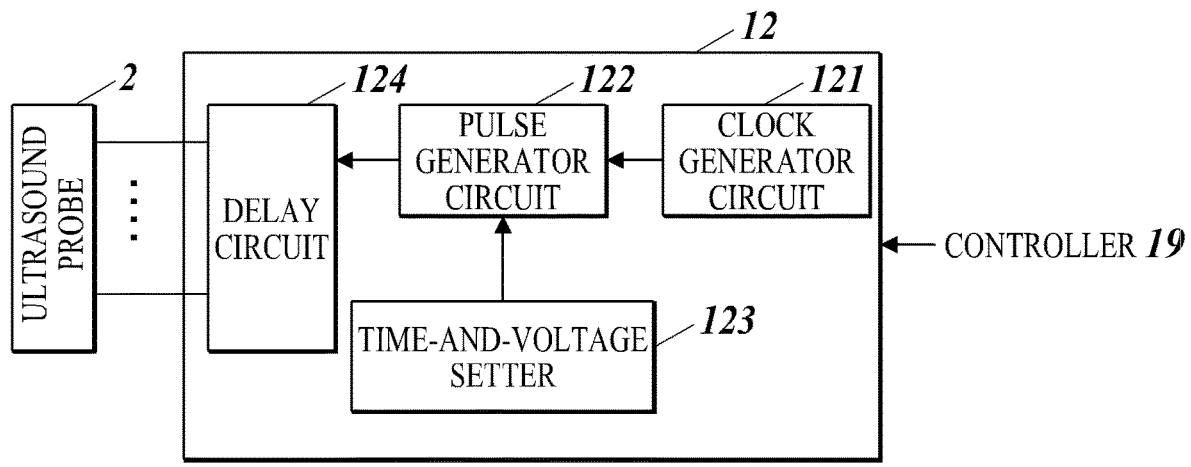
FIG. 3 is a block diagram showing the functional configuration of a transmitter.
Figure 4A:
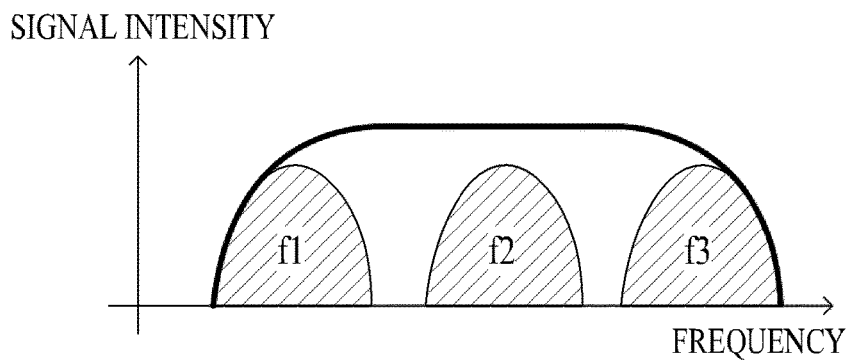
FIG. 4A shows frequency characteristics of signal intensity of transmission ultrasound.
Figure 4B:
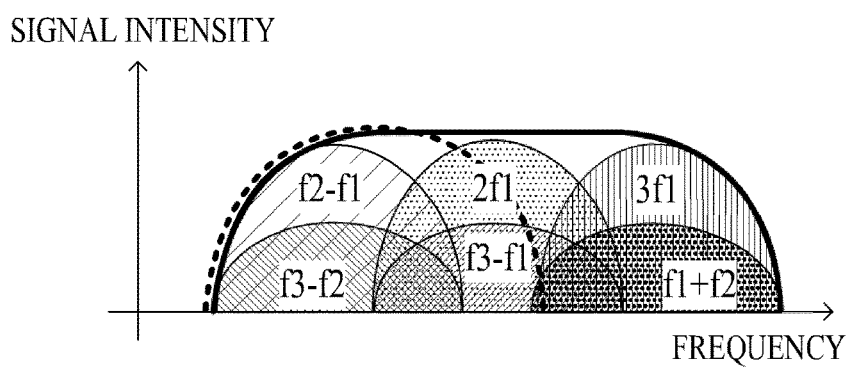
FIG. 4B shows frequency characteristics of signal intensity of reflected ultrasound.

The first embodiment of the present disclosure will be described with reference to FIG. 1 to FIG. 9. First, with reference to FIG. 1 to FIG. 8, the configuration of a diagnostic ultrasound apparatus 100A as a diagnostic ultrasound apparatus of this embodiment will be described. FIG. 1 shows the external configuration of the diagnostic ultrasound apparatus 100A according to this embodiment. FIG. 2 is a block diagram showing the functional configuration of the diagnostic ultrasound apparatus 100A. FIG. 3 is a block diagram showing the functional configuration of a transmitter 12. FIG. 4A shows frequency characteristics of signal intensity of transmission ultrasound. FIG. 4B shows frequency characteristics of signal intensity of reflected ultrasound.

Figure 5:
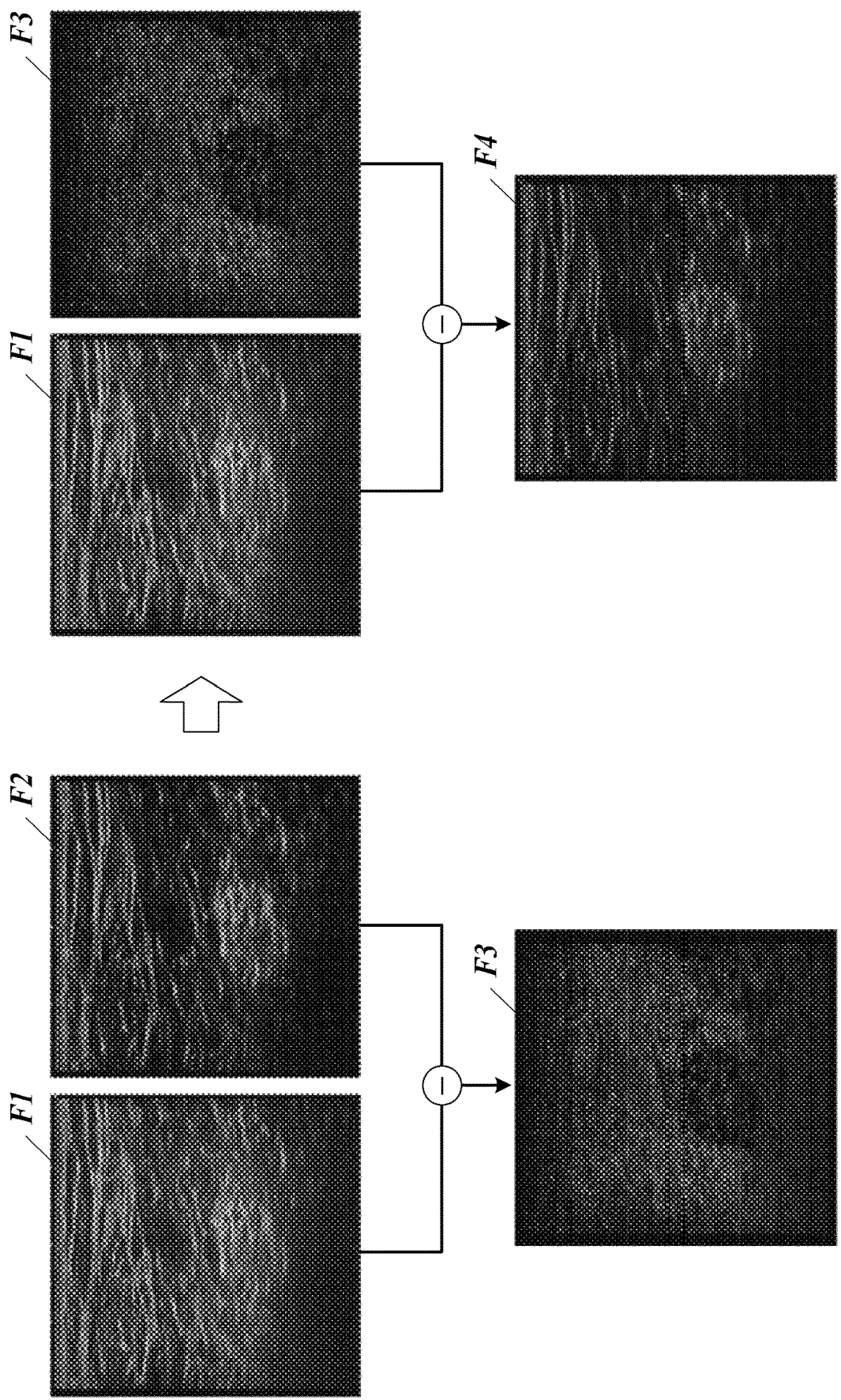
FIG. 5 shows that a difference image is generated by subtracting a second ultrasound image from a first ultrasound image, and a sub-difference image is generated by subtracting the difference image from the first ultrasound image.
Figure 6:
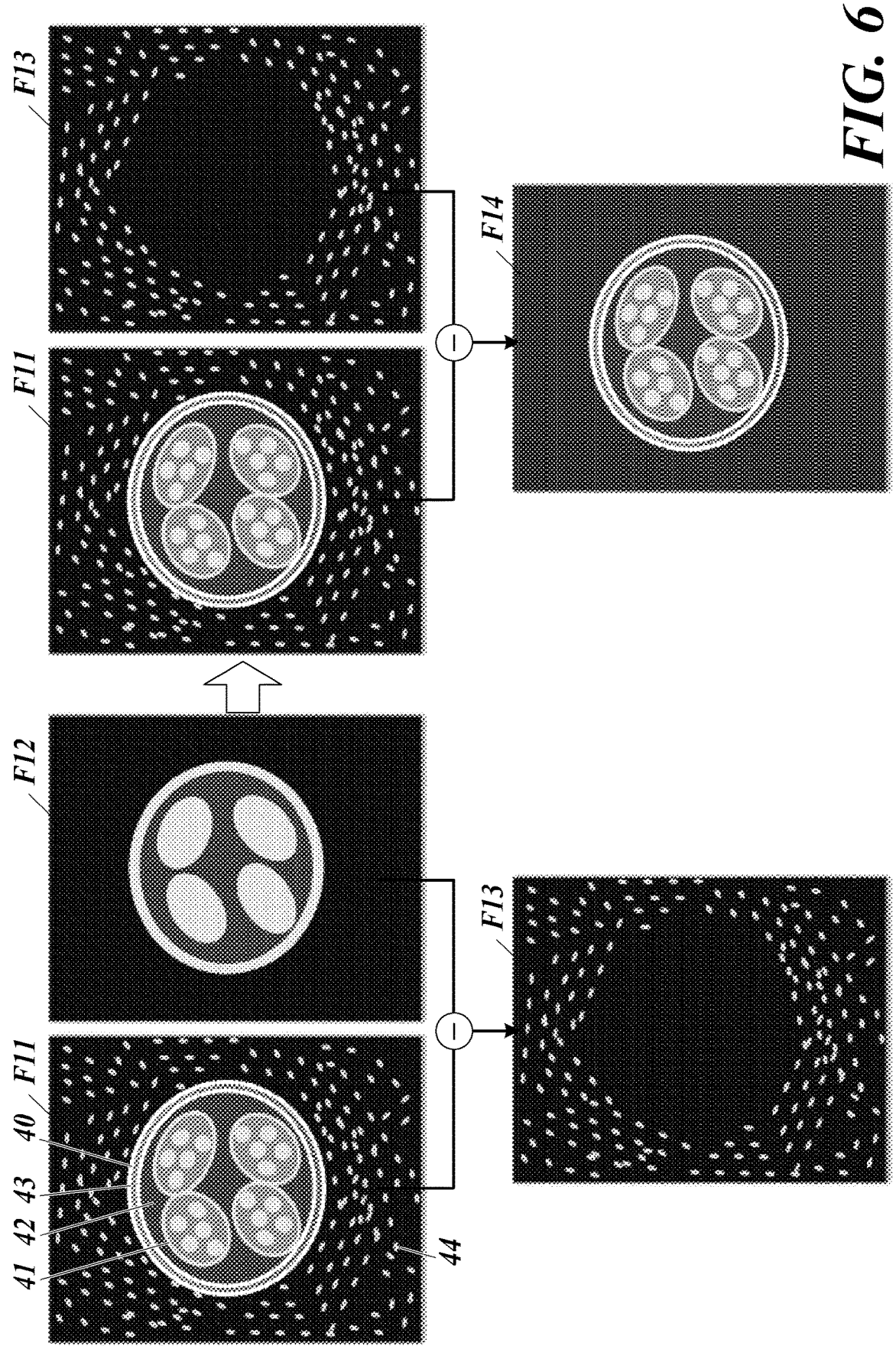
FIG. 6 is a schematic view showing that a difference image is generated by subtracting a second ultrasound image from a first ultrasound image, and a sub-difference image is generated by subtracting the difference image from the first ultrasound image.
Figure 7:
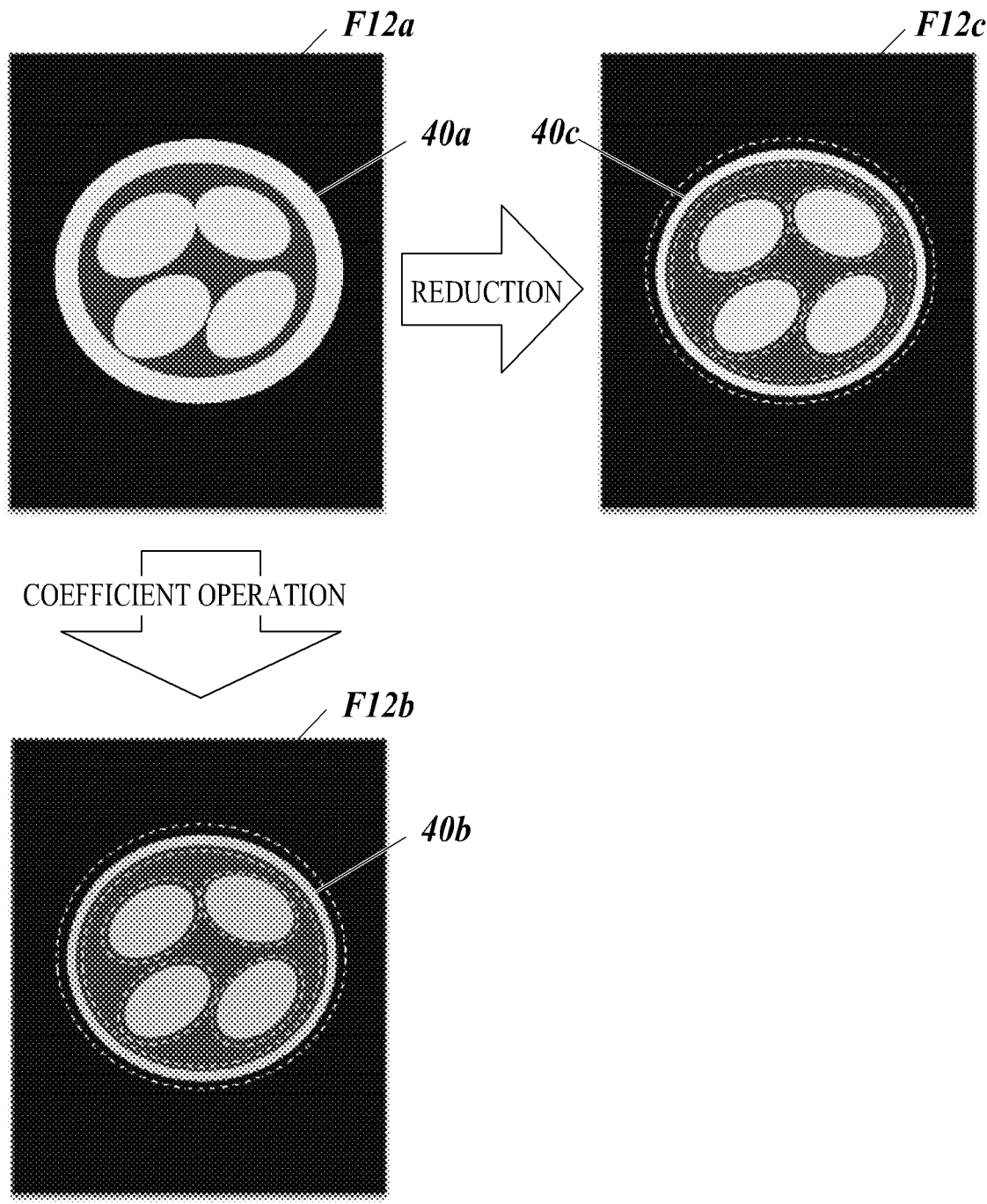
FIG. 7 shows an ultrasound image generated from a second ultrasound image by coefficient operation and an ultrasound image generated from the second ultrasound image by reduction.
Figure 8:
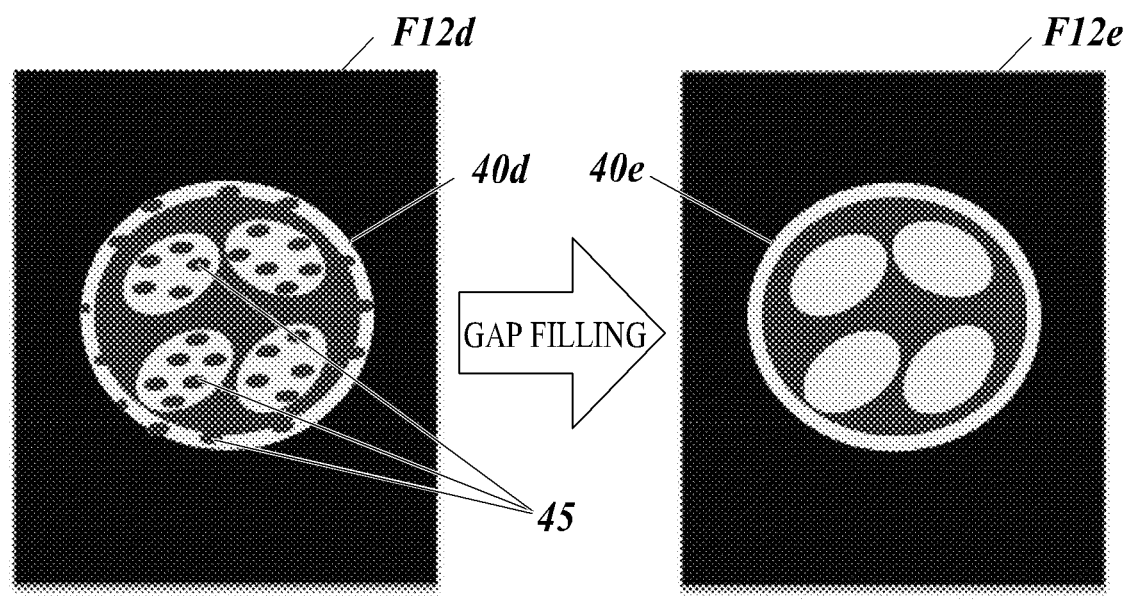
FIG. 8 shows an ultrasound image generated from a second ultrasound image by gap filling.

FIG. 5 shows that an ultrasound image F2 is subtracted from an ultrasound image F1, so that a difference image F3 is generated, and that the difference image F3 is subtracted from the ultrasound image F1, so that a sub-difference image F4 is generated. FIG. 6 is a schematic view showing that an ultrasound image F12 is subtracted from an ultrasound image F11, so that a difference image F13 is generated, and that the difference image F13 is subtracted from the ultrasound image F11, so that a sub-difference image F14 is generated. FIG. 7 shows that an ultrasound image F12b is generated from an ultrasound image F12a by coefficient operation, and that an ultrasound image F12c is generated from the ultrasound image F12a by reduction. FIG. 8 shows that an ultrasound image F12e is generated from an ultrasound image F12d by gap filling.

The diagnostic ultrasound apparatus 100A according to this embodiment is disposed in a medical facility, such as a hospital, and includes a main part 1A and an ultrasound probe 2 as shown in FIG. 1 and FIG. 2. The ultrasound probe 2 transmits ultrasound (transmission ultrasound) to a not-shown subject, such as a living body, and receives reflected waves of the ultrasound (reflected ultrasound: echo) reflected by the subject. The main part 1A is connected to the ultrasound probe 2 via a cable 3, and transmits drive signals of electric signals to the ultrasound probe 2, thereby causing the ultrasound probe 2 to transmit the transmission ultrasound to the subject, and also images the inner state of the subject as ultrasound images on the basis of reception signals of electric signals that the ultrasound probe 2 has generated according to the reflected ultrasound received from the inside of the subject. The main part 1A and the ultrasound probe 2 may communicate by wireless communication, such as UWB (Ultra Wide Band), instead of wired communication via the cable 3.

The ultrasound probe 2 includes transducers composed of piezoelectric elements. The transducers are arranged, for example, in a one-dimensional array in the lateral direction. In this embodiment, the ultrasound probe 2 has, for example, 192 transducers. The transducers may be arranged in a two-dimensional array. The number of transducers can be appropriately set. In this embodiment, the ultrasound probe 2 is an electronic scanning probe employing linear scanning, but may be one employing either electric scanning or mechanical scanning, or one employing linear scanning, sector scanning or convex scanning.

The main part 1A includes, for example, as shown in FIG. 2, an operation inputter 11, a transmitter 12, a receiver 13, a sound ray signal generator 14, an image processer 15A, a DSC (Digital Scan Converter) 16 as an image data generator, an image processor 17A, a display 18 and a controller 19A (hardware processor).

The operation inputter 11 includes, for example, various switches, buttons, a trackball, a mouse and a keyboard for a user, such as a doctor or a technician, to input a command to start diagnosis/examination, data, such as personal information about the subject, and so forth, and outputs operation signals thereon to the controller 19A.

The transmitter 12 is a circuit that, under the control of the controller 19A, supplies drive signals of electric signals to the ultrasound probe 2 via the cable 3, thereby causing the ultrasound probe 2 to generate the transmission ultrasound. As shown in FIG. 3, the transmitter 12 includes, for example, a clock generator circuit 121, a pulse generator circuit 122, a time-and-voltage setter 123 and a delay circuit 124.

The clock generator circuit 121 generates clock signals that determine the transmission timing and the transmission frequency of drive signals. The pulse generator circuit 122 generates pulse signals as drive signals at predetermined intervals. The pulse generator circuit 122 switches, for example, voltages of three levels (+HV, 0(GND), −HV) or five levels (+HV, +MV, 0(GND), −MV, −HV) to output, thereby generating a rectangular wave drive signal(s). The positive amplitude and the negative amplitude of the pulse signals are the same, but not limited thereto. Further, although in this embodiment, voltages of three or five levels are switched to output drive signals, the number of levels thereof is not limited to three or five. The number thereof may be arbitrarily set, but preferably five or less. This can improve degree of freedom in control of frequency components at low cost and generate higher-resolution transmission ultrasound.

The time-and-voltage setter 123 sets (i) the duration of sections at the same voltage level of a drive signal(s) output from the pulse generator circuit 122 and (ii) the voltage level. That is, the pulse generator circuit 122 outputs a drive signal the pulse waveform of which accords with the duration of each section and the voltage level set by the time-and-voltage setter 123. The duration of each section and the voltage level set by the time-and-voltage setter 123 can be changed, for example, by input operations through the operation inputter 11.

The delay circuit 124 sets delay time for the transmission timing of a drive signal for each path corresponding to each transducer, and delays transmission of the drive signals by the set delay times to converge transmission beams of the transmission ultrasound.

Thus-configured transmitter 12 successively shifts, under the control of the controller 19A, the transducers, to each of which the transmitter 12 supplies the drive signal, by a predetermined number of the transducers each time ultrasound is transmitted/received, thereby supplying the drive signal to each of the output-selected transducers. Thus, scanning is performed.

In this embodiment, in order to extract harmonic components, which are described later, pulse inversion can be performed. That is, when pulse inversion is performed, the transmitter 12 can transmit a first pulse signal and a second pulse signal that is polarity-reversed from the first pulse signal onto the same scanning line with a time interval in between. The transmitter 12 may transmit the second pulse signal that is polarity-reversed from the first pulse signal after at least one of multiple duties of the first pulse signal is made different, or may transmit the second pulse signal that is time-reversed from the first pulse signal.

The receiver 13 is a circuit that, under the control of the controller 19A, receives reception signals of electric signals from the ultrasound probe 2 via the cable 3.

The sound ray signal generator 14 is a circuit that, under the control of the controller 19A, generates a sound ray signal(s) from reception signals received by the receiver 13. The sound ray signal generator 14 includes, for example, a harmonic component extractor 14a, an amplifier, an A/D converter circuit and a phasing adding circuit. The harmonic component extractor 14a performs pulse inversion to extract harmonic components from reception signals output from the receiver 13. In this embodiment, the harmonic component extractor 14a can extract a signal component(s) mainly composed of a second harmonic(s). The second harmonic component can be extracted by summing (combining) reception signals obtained from the reflected ultrasounds (ultrasound waves) corresponding to two transmission ultrasounds (ultrasound waves) generated from the first pulse signal and the second pulse signal, respectively, removing fundamental components contained in the reception signals, and then performing filtering. When an odd-order harmonic component, such as a third harmonic, is used, the harmonic component can be extracted by subtracting first and second reception signals respectively corresponding to the first and second pulse signals and then removing the fundamental components with a filter or the like. Both the even-order harmonic component obtained by addition and the odd-order harmonic component obtained by subtraction may be used. In this case, phase adjustment is performed with an all-pass filter or the like such that the phase of an odd-order harmonic reception signal(s) matches the phase of an even-order harmonic reception signal(s), and they are added up (combined) at the stage of reception signals before envelope detection, so that the frequency band of the even-order harmonic reception signal and the frequency band of the odd-order harmonic reception signal are combined, and a reception signal(s) having a wider band can be obtained.

The amplifier is a circuit that amplifies, for each path corresponding to each transducer, the reception signals, from which the harmonic component extractor 14a has extracted the harmonic component(s), at a preset amplification factor. The A/D converter circuit is a circuit that performs analog-digital conversion (A/D conversion) on the amplified reception signals. The phasing adding circuit is a circuit that gives, for each path corresponding to each transducer, delay time to the A/D-converted reception signals to adjust time phase, and adds up (phase-adds) the reception signals to generate a digital sound ray signal(s) (sound ray data).

For example, the transmitter 12 generates a drive signal(s) for transmitting the transmission ultrasound containing fundamentals f1, f2, f3 shown in FIG. 4A. FIG. 4A shows frequency on the horizontal axis, sensitivity (signal intensity) on the vertical axis, and frequency band of the ultrasound probe 2 with a bold solid line. The same applies to FIG. 4B.

As frequency components of reception signals obtained by the receiver 13 and the sound ray signal generator 14, harmonic components of the reflected ultrasounds (ultrasound waves) corresponding to the transmission ultrasounds (ultrasound waves) of the fundamentals f1, f2, f3 are as shown in FIG. 4B. That is, as harmonic components of the reflected ultrasounds, frequency components of frequencies f3-f2, f2-f1, f3-f1, 2f1 and f1+f2 each derived from at least one of the fundamentals f1, f2, f3 are obtained. The sound ray signal generator 14 generates sound ray signals containing all the frequency components shown in FIG. 4B.

The signal processor 15A includes imaging signal extractors 15a, 15b (extractor(s)) and signal shapers 15c, 15d. Under the control of the controller 19A, on the basis of sound ray signals from the sound ray signal generator 14, the signal processor 15A generates a difference imaging signal between a first imaging signal containing high-frequency components and a second imaging signal not containing high-frequency components, and generates a sub-difference imaging signal between the first imaging signal and the difference imaging signal.

The imaging signal extractor 15a is a circuit that includes a band-pass filter, and under the control of the controller 19A, extracts the first imaging signal from the sound ray signal from the sound ray signal generator 14 with the band-pass filter passing frequency components of a band containing many high-frequency components. The imaging signal extractor 15b is a circuit that includes a band-pass filter, and under the control of the controller 19A, extracts the second imaging signal from the sound ray signal from the sound ray signal generator 14 with the band-pass filter passing frequency components of a band not containing high-frequency components.

The imaging signals that are extracted by the different band-pass filters of the imaging signal extractors 15a, 15b preferably have different contents of the components on the high-frequency side, and the difference imaging signal is preferably generated by using the first imaging signal having a large content of the components on the high-frequency side as a reference signal and the second imaging signal having a small content of the components on the high-frequency side as a subtraction signal that is subtracted from the first imaging signal. This makes it possible to effectively select and extract reception components derived from scatterers by utilizing frequency dependence of ultrasound scattering intensity. Further, the reference signal being wider-band than the subtraction signal is preferable for obtaining high resolution.

Cutoff characteristics of the different band-pass filters are appropriately determined for each type of the ultrasound probe 2 by acoustic characteristics thereof and/or an observation target, but multiple combinations may be prepared. Selection from the multiple combinations may be automatically or manually performed, for example, by a method of automatic selection linked to selection of an observation target (e.g. a region of the subject) performed by the user through the operation inputter 11, a method of adaptive automatic selection based on an evaluation value of a feature amount detected from imaging signals, or a method of selection/input performed by the user through the operation inputter 11 as needed. The band-pass filters may not be fixed filters, and may be so-called dynamic filters the cutoff characteristics of which change continuously with the depth.

For example, the imaging signal extractor 15a generates the first imaging signal from the sound ray signal generated by the sound ray signal generator 14, by performing filtering with a band-pass filter indicated by a bold solid line, the band-pass filter passing all the frequency components shown in FIG. 4B. On the other hand, the imaging signal extractor 15b generates the second imaging signal from the sound ray signal generated by the sound ray signal generator 14, by performing filtering with a band-pass filter indicated by a dotted line, the band-pass filter removing high-frequency components of all the frequency components shown in FIG. 4B.

B-mode images to which the present disclosure is applied are not limited to the harmonic imaging mode described above, and also applicable to a fundamental imaging mode. However, in the fundamental imaging mode, acoustic noise caused by side lobe or the like is likely to be imaged as artifacts and inhibit extraction of scatterer echo signal components. Hence, use of the harmonic imaging mode is preferable. Further, application of the transmission/reception method disclosed in JP 2014-168555 A, JP 2015-112261 A, JP patent application No. 2015-103842(JP 2016-214622 A) or the like to the present disclosure is far preferable because difference image information of high-frequency components can be obtained over a wider depth region from a shallow portion to a deep portion.

The image shaper 15c performs, under the control of the controller 19A, envelope detection, log compression and/or the like on the first imaging signal generated by the imaging signal extractor 15a, thereby generating a first imaging signal for generating B-mode image data. The image shaper 15d performs, under the control of the controller 19A, envelope detection, log compression and/or the like on the second imaging signal generated by the imaging signal extractor 15b, thereby generating a second imaging signal for generating B-mode image data.

The DSC 16 performs, under the control of the controller 19A, dynamic range adjustment and/or gain adjustment on the first imaging signal and the second imaging signal input from the signal shapers 15c, 15d to perform brightness conversion, and performs coordinate conversion or the like, thereby generating first image data and second image data as B-mode image data for display. The B-mode image data show intensity of reception signals by brightness.

The image processor 17A is a circuit that, under the control of the controller 19A, performs image processing on the first image data and the second image data generated by the DSC 16, and includes an image calculator 17a (arithmetic unit), a coefficient-for-operation determiner 17b and a display image synthesizer 17c.

The image calculator 17a is a circuit that, under the control of the controller 19A, performs pre-processing for difference calculation on at least one (in this embodiment, both) of the first image data and the second image data input from the DSC 16, subtracts the pre-processed second image data from the pre-processed first image data, thereby generating difference image data, and subtracts the generated difference image data from the pre-processed first image data, thereby generating sub-difference image data. The image calculator 17a may use the first image data corresponding to the reference signal and the second image data corresponding to the subtraction signal without performing pre-processing thereon, namely, may use image data of original signals as they are, to generate difference image data.

For example, when pre-processing is not performed, as shown in FIG. 5, second image data of an ultrasound image F2 is subtracted from first image data of an ultrasound image F1, so that difference image data of a difference image F3 is generated. Further, the difference image data of the difference image F3 is subtracted from the first image data of the ultrasound image F1, so that sub-difference image data of a sub-difference image F4 is generated.

The ultrasound image F1 contains high-frequency components and is wide-band, and hence is an ultrasound image having high resolution and containing many scatter components. The ultrasound image F2 is an ultrasound image with the high-frequency components cut and accordingly is little influenced by the scatter components. However, because the ultrasound image F2 is mainly composed of low-frequency components and is narrow-band, it is an ultrasound image having low resolution. The difference image F3 is an ultrasound image that does not contain reflection components and where only the high-resolution scatter components are extracted. The sub-difference image F4 is an ultrasound image that has high resolution and where imaging of the scatter components is suppressed.

FIG. 6 is a schematic view showing a case in which the subject is a peripheral nerve of a patient, wherein the difference image data and the sub-difference image data are generated from the first image data and the second image data. Second image data of an ultrasound image F12 is subtracted from first image data of an ultrasound image F11, so that difference image data of a difference image F13 is generated. Further, the difference image data of the difference image F13 is subtracted from the first image data of the ultrasound image F11, so that sub-difference image data of a sub-difference image F14 is generated.

The ultrasound image F11 includes: fiber bundles 41, an epineurium 42 and a paraneural sheath 43 of a peripheral nerve 40; and scatter components 44 as speckle noise. For example, a puncture needle is inserted at a position between the epineurium 42 and the paraneural sheath 43 as a target position to inject a medical fluid. The sub-difference image F14 is an image in which the scatter components 44 are suppressed, and the fiber bundles 41, the epineurium 42 and the paraneural sheath 43 are drawn with high resolution. Hence, referring to the sub-difference image F14, the user can insert a puncture needle at a correct target position without damaging other parts.

The imaging signals used for generating the difference image data are envelope-detected and log-compressed sound my signals, and when a negative value is produced by generating the difference image data, it is preferable to use the difference image data as a zero value.

Examples of the pre-processing include binarization, coefficient operation, gap filling and reduction. The image calculator 17a may, as binarization, binarize each of the first image data and the second image data and then generate the difference image data, thereby generating difference image data of binary signals.

The image calculator 17a may, as coefficient operation, multiply, for example, the second image data by a coefficient as needed, the coefficient being obtained from the coefficient-for-operation determiner 17b, and then subtract the second image data multiplied by the coefficient from the first image data, thereby generating the difference image data. The coefficient-for-operation determiner 17b determines and outputs, under the control of the controller 19A, the coefficient for difference image data to the image calculator 17a. Determination of the coefficient may be automatically or manually performed, for example, by a method of selection in accordance with a value of the depth, wherein the coefficient is preset so as to change its value in the depth direction, a method of automatic selection linked to selection of an observation target (e.g. a region of the subject) performed by the user through the operation inputter 11, a method of adaptive automatic selection based on an evaluation value of a feature amount detected from imaging signals, or a method of selection/input performed by the user through the operation inputter 11 as needed.

For example, as shown in FIG. 7, second image data of an ultrasound image F12a is generated. As compared with the ultrasound image F11, due to cutting of the high-frequency components, the ultrasound image F12a has lower resolution, and has dilated bright portions and accordingly has a dilated peripheral nerve 40a. By multiplying the ultrasound image F12a by a coefficient (≤1), an ultrasound image F12b is obtained. The ultrasound image F12b has a peripheral nerve 40b of the same size as the peripheral nerve 40 as a reflector region in the ultrasound image F11. That is, the size of the region of the peripheral nerve is made appropriate. In the ultrasound image F12b, the contours of the peripheral nerve 40a are represented by dotted lines.

The image calculator 17a may, as gap filling (interpolation), fill missing portions (dark portions) in the second image data not to leave the dark portions in a difference image when, for example, because the second image data is narrower-band than the first image data being the reference signal, roughening of bright portions occurs therein by decrease in the total amount of signals caused by the band limit, to be more specific, when in the second image data, signal loss/damage occurs in a continuous tissue (dark portions are generated in a bright portion(s), and the bright portion is torn or has many gaps/holes or the like, thereby being discontinuous (poor in connectivity)). Signals derived from reflectors in the missing portions can be prevented from remaining in the difference image data.

For example, as shown in FIG. 8, second image data of an ultrasound image F12d is generated. As compared with the ultrasound image F11, due to cutting of the high-frequency components, the total amount of signals is less in the ultrasound image F12d, and missing points 45 being dark portions as missing portions appear on an image of a peripheral nerve 40d. Gap filling of the missing points 45 generates an ultrasound image F12e having a peripheral nerve 40e. Thanks to gap filling, the image of the peripheral nerve 40e has continuity.

The image calculator 17a may perform, as reduction, erosion, which is morphology processing, after binary conversion on the second image data in which the same reflector(s) is drawn larger and thicker than in the reference signal (first image data) because the second image data being the subtraction signal is narrower-band than the reference signal, thereby adjusting the size of the reflector region(s) in the second image data to match the size thereof in the reference signal. This makes it possible to accurately extract reception signals derived from scatterers in the second image data including reflector nearby regions therein. The reduction may be an isotropic process that is performed uniformly in all directions, or may be an anisotropic process that is performed, for example, only in the axial direction in which size increase is likely to occur due to band narrowing.

For example, as shown in FIG. 7, the second image data of the ultrasound image F12a is generated. The ultrasound image F12a has the dilated peripheral nerve 40a. By reducing the ultrasound image F12a, an ultrasound image F12c is obtained. The ultrasound image F12c has a peripheral nerve 40c of the same size as the peripheral nerve 40 as a reflector region in the ultrasound image F11. That is, the size of the region of the peripheral nerve is made appropriate. In the ultrasound image F12c, the contours of the peripheral nerve 40a are represented by dotted lines.

The image data on which the image calculator 17a performs sub-difference calculation by using the difference image data is preferably the first image data being the reference signal. By performing an arithmetic operation (calculation) on the reference signal, which is wide-band and has high resolution, by using the difference image data being the imaging signal derived from scatterers extracted as the difference signal, high drawing performance can be kept, and also the imaging signal(s) derived from scatterers (e.g. scatter components 44), which are obstacles to needle visibility at the time of needling or the like, can be suppressed. The arithmetic operation may be a difference process on the image data of the imaging signal, or may be a process of binarizing the difference image data to form a binary mask imaging signal, multiplying the image data of the imaging signal, and subtracting the difference image data as the imaging signal derived from scatterers by a certain ratio. When the difference process is performed, an arithmetic operation may be performed after multiplication of the difference image data by a coefficient, the difference image data being subtracted from the image data being the original imaging signal. The coefficient for the difference calculation and the coefficient for the multiplication may be fixed values, but are preferable to be changeable by a method of automatic/adaptive determination by an evaluation determiner or a method of selection/input of the coefficients by the user through the operation inputter 11. The image data on which the image calculator 17a performs sub-difference calculation by using the difference image data may be the second image data.

The display image synthesizer 17c generates, under the control of the controller 19A, in response to, for example, an operation input made by the user through the operation inputter 11, combined image data for parallel display of the sub-difference image data and the first or second image data input from the image calculator 17a, or colors the sub-difference image data and generates combined image data of the colored sub-difference image data and the first or second image data, or the like, and then outputs a display signal(s) of the image data, the generated combined image data and/or the like to the display 18.

As the display 18, a display device, such as an LCD (Liquid Crystal Display), a CRT (Cathode Ray Tube) display, an organic EL (Electronic Luminescence) display, an inorganic EL display or a plasma display, can be used. The display 18 displays ultrasound images on its display screen in response to display signals of image data, combined image data and so forth output from the image processor 17A.

The controller 19A includes, for example, a CPU (Central Processing Unit), a ROM (Read Only Memory) and a RAM (Random Access Memory), and reads and loads a system program and various process programs stored in the ROM to the RAM and performs centralized control of operation of each component of the diagnostic ultrasound apparatus 100A in accordance with the loaded programs. The ROM is composed of a nonvolatile memory, such as a semiconductor memory, and stores, for example, the system program for the diagnostic ultrasound apparatus 100A; the various process programs executable on the system program; and various data. These programs are stored in the form of computer readable program codes, and the CPU operates in accordance with the program codes. The ROM stores, for example, a first ultrasound-image-display program for the below-described first ultrasound-image-display process. The RAM provides a work area where the various programs to be executed by the CPU and data relevant to the programs are temporarily stored.

As to the components of the main part 1A, all or some of the functions of the respective function blocks can be realized by a hardware circuit(s), such as an integrated circuit(s). The integrated circuit is, for example, an LSI (Large Scale Integration), and LSI may be called IC, system LSI, super LSI or ultra LSI, depending on the degree of integration. The method for forming the integrated circuit is not limited to LSI, and the functions may be realized by a dedicated circuit or a versatile processor, or realized by making use of an FPGA (Field Programmable Gate Array) or a reconfigurable processor that can reconfigure connection and setting of circuit cells in LSI. Alternatively, all or some of the functions of the respective function blocks may be performed by software. In this case, the software is stored in one or more storage media, such as ROMs, optical disks and hard disks, and performed by an arithmetic unit.

Figure 9:
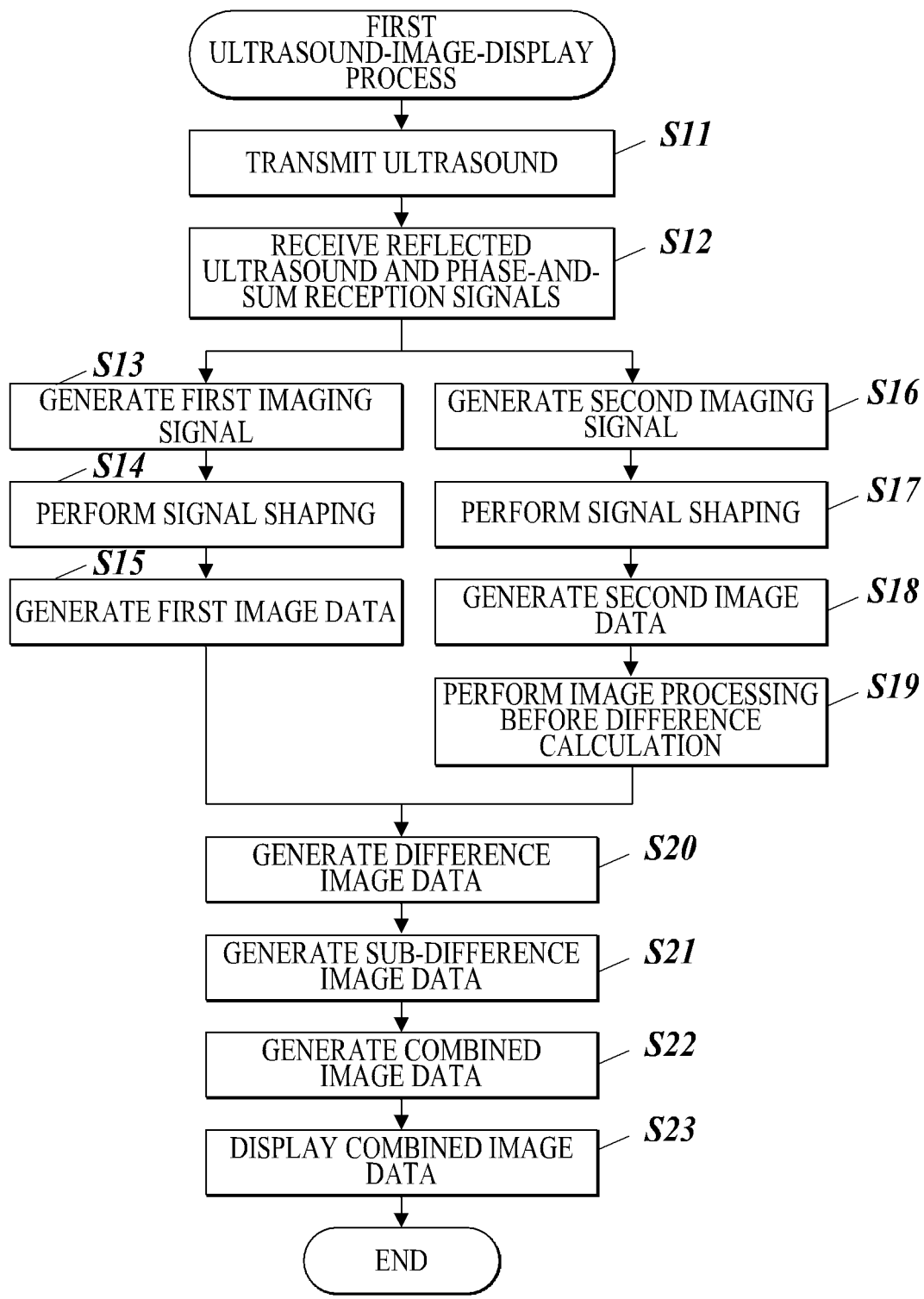
FIG. 9 is a flowchart showing a first ultrasound-image-display process.

Next, operation of the diagnostic ultrasound apparatus 100A will be described with reference to FIG. 9. FIG. 9 is a flowchart showing the first ultrasound-image-display process.

In the diagnostic ultrasound apparatus 100A, for example, the controller 19A performs the first ultrasound-image-display process in accordance with the first ultrasound-image-display program stored in the ROM in response to, as a trigger, an instruction to perform the first ultrasound-image-display process input by the user through the operation inputter 11. The flowchart of FIG. 9 represents the flow of generation and display of ultrasound image data of one frame. Although this flow will be described, in reality, as live ultrasound image display or the like, ultrasound image data of two or more frames are generated and displayed continuously. The same applies to FIG. 11, which will be described later.

As shown in FIG. 9, first, the controller 19A causes the transmitter 12 to generate a drive signal (of triad THI (Triad Tissue Harmonic Imaging)) containing three fundamental components for pulse inversion shown in FIG. 4A, thereby causing the ultrasound probe 2 to transmit ultrasound corresponding to the drive signal to the subject (Step S11). Next, the controller 19A causes the receiver 13 to receive reflected ultrasound of the ultrasound transmitted in Step S11 reflected and scattered by the subject, thereby generating reception signals, and causes the sound ray signal generator 14 to extract harmonic components from the reception signals by pulse inversion, and amplify, A-to-D convert, and phase and sum (add up) the reception signals, from which the harmonic components have been extracted, thereby generating a sound ray signal(s) containing the harmonic components of the three fundamental components (Step S12).

Next, the controller 19A causes the imaging signal extractor 15a to pass the sound ray signal generated in Step S12 through its band-pass filter, thereby generating a first imaging signal (Step S13). Next, the controller 19A causes the signal shaper 15c to perform envelope detection and log compression on the first imaging signal generated in Step S13 (Step S14). Next, the controller 19A causes the DSC 16 to generate first image data (first image signal) from the envelope-detected and log-compressed first imaging signal generated in Step S14 (Step S15).

Further, in parallel with Step S13, the controller 19A causes the imaging signal extractor 15b to pass the sound ray signal generated in Step S12 through its band-pass filter, thereby generating a second imaging signal (Step S16). Next, the controller 19A causes the signal shaper 15d to perform envelope detection and log compression on the second imaging signal generated in Step S16 (Step S17). Next, the controller 19A causes the DSC 16 to generate second image data (second image signal) from the envelope-detected and log-compressed second imaging signal generated in Step S17 (Step S18).

Next, the controller 19A causes the image calculator 17a to perform pre-processing (binarization, coefficient operation, gap filling, reduction, etc.) on the second image data generated in Step S18 (Step S19). In Step S19, the pre-processing may or may not be performed in accordance with pre-processing setting information that is, for example, preset manually.

Next, the controller 19A causes the image calculator 17a to subtract the pre-processed or not-pre-processed second image data generated in Step S19 from the first image data generated in Step S15, thereby generating difference image data (Step S20). Next, the controller 19A causes the image calculator 17a to subtract the difference image data generated in Step S20 from the first image data generated in Step S15, thereby generating sub-difference image data (Step S21).

Next, the controller 19A causes the display image synthesizer 17c to combine the first image data generated in Step S15 or the second image data generated in Step S19 with the sub-difference image data generated in Step S21, thereby generating combined image data (Step S22). Next, the controller 19A causes the image processor 17A to cause the display 18 to display the combined image data generated in Step S22 (Step S23), and then ends the first ultrasound-image-display process.

Example

Next, as an example of the first embodiment, observation examples will be described in which the diagnostic ultrasound apparatus 100A was used to scan phantoms as the subject, and analysis information thereon was obtained. Phantoms P1 to P4 were prepared as phantoms to be observed (i.e. observation target(s)). The composition (characteristics) of each of the phantoms P1 to P4 is summarized in Table I below.

TABLE I

| PHANTOM NO. | MAIN MATERIAL | REFLECTION SUBSTANCE A | SCATTER SUBSTANCE B | SCATTER SUBSTANCE C | WIRE TARGET |
|---|---|---|---|---|---|
| P1 | AGAR | — | — | — | DEPTH 15 mm EMBEDDED |
| P2 | | 100 | — | — | |
| P3 | | 100 | 30 | — | |
| P4 | | 100 | 30 | 30 | |

Each of the phantoms P1 to P4 was composed of a main material of agar as a base, a wire target as a wire to be observed (observation target) embedded in the agar, and a reflection substance A and scatter substances B, C arbitrarily mixed. The reflection substance A was polystyrene beads having a mean particle diameter of 600 μm, and a material manufactured by Polysciences Inc. was used. The scatter substance B was acrylic particles having a mean particle diameter of 30 μm, and MX-3000 manufactured by Soken Chemical & Engineering Co., Ltd. was used. The scatter substance C was acrylic particles having a mean particle diameter of 5 μm, and MX-500 manufactured by Soken Chemical & Engineering Co., Ltd. was used. The wire target was an observation target corresponding to a puncture needle, and was a stainless steel wire of 50 μmφ.

The procedure for producing each phantom was as follows: in 1 kg of 1.5 wt % agar solution heated to 85° C. the reflection substance A and the scatter substances B, C were mixed/poured with their weights [g] shown in Table I and sufficiently uniformly dispersed, and then in a container provided with the wire target, the resulting product was poured such that the wire target was at a predetermined depth of 15 mm, and cooled to gelatinize. The phantoms P1 to P4 were thus produced.

The phantom P1 did not contain any reflection or scatter substance in a matrix. That is, the phantom P1 provided ideal resolution and wire-matrix brightness difference. The matrix was, of the main material around the wire target, a portion in which the reflection substance and the scatter substances were mixed or not mixed. The phantom P2 contained the reflection substance A corresponding to boundaries of a tissue structure(s) or the like, but did not contain either of the scatter substances B, C in the tissue. That is, the phantom P2 corresponds to a tissue of the subject under good condition observed.

The phantom P3 contained, in addition to the reflection substance A, a certain amount of the scatter substance B in the tissue. That is, the phantom P3 corresponds to the tissue of the subject under moderate condition observed. The phantom P4 contained, in addition to the reflection substance A, a large amount of the scatter substances B, C in the tissue. That is, the phantom P4 corresponds to the tissue of the subject under bad condition observed.

The phantoms P1 to P4 were scanned and observed. Observation examples 1 to 8 are summarized in Table II and Table III below, which include: conditions of the ultrasound probe 2 ("Ultrasound Probe Characteristics"), imaging conditions ("Imaging Conditions"), phantom numbers of observation targets ("Phantom No. of Observation Target"), methods for image calculation ("Image Calculation") and image drawing evaluation ("Image Drawing Evaluation"). In Table II and Table III, about the image drawing evaluation, values (numerals or words) with (A), nothing, (B) and (C) in cells represent being excellent, good, slightly deteriorated and deteriorated, respectively.

TABLE II

| | ULTRASOUND PROBE CHARACTERISTICS | IMAGING CONDITIONS PASSBAND OF | | PHANTOM NO. | | IMAGE DRAWING EVALUATION RESOLUTION OF WIRE TARGET | |
|---|---|---|---|---|---|---|---|
| | −20 i8 BAND (MHz-MHz) | BAND-PASS FILTER (MHz-MHz) | | OF OBSER- | | AXIAL RESO- | LATERAL RESO- |
| | FRACTIONAL BANDWIDTH | FIRST IMAGE | SECOND IMAGE | VATION TARGET | IMAGE CALCULATION | LUTION (μm) | LUTION (μm) |
| OBSERVATION EXAMPLE 1 | 4-19 <130%> | 4-18 | — | P1 | NO (FIRST IMAGE ONLY) | 116 (A) | 220 (A) |
| | | | | P2 | | 122 (A) | 232 (A) |
| | | | | P3 | | 128 (A) | 239 (A) |
| | | | | P4 | | 133 (A) | 245 (A) |
| OBSERVATION EXAMPLE 2 | | 4-12 | — | P1 | NO (FIRST IMAGE ONLY) | 185 (C) | 288 (B) |
| | | | | P2 | | 196 (C) | 272 (B) |
| | | | | P3 | | 206 (C) | 283 (B) |
| | | | | P4 | | 218 (C) | 297 (B) |
| OBSERVATION EXAMPLE 3 | | 4-18 | 4-12 | P1 | (FIRST IMAGE) − [(FIRST IMAGE) − (SECOND IMAGE)] | 115 (A) | 222 (A) |
| | | | | P2 | | 124 (A) | 230 (A) |
| | | | | P3 | | 130 (A) | 241 (A) |
| | | | | P4 | | 138 (A) | 255 (A) |

TABLE II-continued

| | Ultrasound Probe Characteristics -20 dB Band (MHz-MHz) Fractional Bandwidth | Imaging Conditions Passband of Band-pass filter (MHz-MHz) First Image | Imaging Conditions Passband of Band-pass filter (MHz-MHz) Second Image | Phantom No. of Observation Target | Image Calculation | Image Drawing Evaluation Resolution of Wire Target Axial Resolution (μm) | Image Drawing Evaluation Resolution of Wire Target Lateral Resolution (μm) |
|---|---|---|---|---|---|---|---|
| OBSERVATION EXAMPLE 4 | | 4-18 | 4-8 | P1 | (FIRST IMAGE) − [(FIRST IMAGE) − (SECOND IMAGE)] | 117 | 221 |
| | | | | P2 | | 128 | 235 |
| | | | | P3 | | 138 | 241 |
| | | | | P4 | | 155 (B) | 266 (B) |
| OBSERVATION EXAMPLE 5 | | 4-18 | 4-12 | P1 | (FIRST IMAGE) − [(FIRST IMAGE) − (SECOND IMAGE) × 0.8] | 117 (A) | 225 (A) |
| | | | | P2 | | 128 (A) | 235 (A) |
| | | | | P3 | | 132 (A) | 244 (A) |
| | | | | P4 | | 137 (A) | 255 (A) |
| OBSERVATION EXAMPLE 6 | | 4-18 | 4-12 | P1 | (FIRST IMAGE) − [(FIRST IMAGE) − (SECOND IMAGE) × REDUCTION] | 115 (A) | 218 (A) |
| | | | | P2 | | 120 (A) | 230 (A) |
| | | | | P3 | | 126 (A) | 235 (A) |
| | | | | P4 | | 130 (A) | 240 (A) |

| | IMAGE DRAWING EVALUATION | | | |
|---|---|---|---|---|
| | HIGHEST BRIGHTNESS OF WIRE | MEAN BRIGHTNESS OF MATRIX | WIRE-MATRIX BRIGHTNESS DIFFERENCE | SCATTER AROUND WIRE TARGET |
| OBSERVATION EXAMPLE 1 | 160 | 4 | 156 (A) | — |
| | 153 | 15 | 138 (A) | NO |
| | 148 | 78 | 71 (B) | NO |
| | 140 | 106 | 34 (C) | NO |
| OBSERVATION EXAMPLE 2 | 153 | 3 | 150 (A) | — |
| | 148 | 13 | 135 (A) | NO |
| | 142 | 31 | 111 (A) | NO |
| | 135 | 41 | 84 (A) | NO |
| OBSERVATION EXAMPLE 3 | 153 | 2 | 151 (A) | — |
| | 148 | 13 | 135 (A) | NO |
| | 142 | 34 | 108 (A) | HARDLY ANY |
| | 135 | 44 | 91 (A) | A LITTLE (B) |
| OBSERVATION EXAMPLE 4 | 148 | 2 | 147 (A) | — |
| | 144 | 15 | 128 (A) | HARDLY ANY |
| | 139 | 20 | 119 (A) | A LITTLE (B) |
| | 128 | 23 | 105 (A) | YES (C) |
| OBSERVATION EXAMPLE 5 | 124 (B) | 2 | 122 (A) | — |
| | 120 (B) | 13 | 107 (A) | NO |
| | 117 (B) | 27 | 90 (A) | NO |
| | 114 (B) | 33 | 81 (A) | HARDLY ANY |
| OBSERVATION EXAMPLE 6 | 151 | 2 | 149 (A) | — |
| | 146 | 13 | 133 (A) | NO |
| | 140 | 30 | 110 (A) | NO |
| | 132 | 39 | 93 (A) | NO |

TABLE II

| | Ultrasound Probe Characteristics -20 dB Band (MHz-MHz) Fractional Bandwidth | Imaging Conditions Passband of Band-pass filter (MHz-MHz) First Image | Imaging Conditions Passband of Band-pass filter (MHz-MHz) Second Image | Phantom No. of Observation Target | Image Calculation | Image Drawing Evaluation Resolution of Wire Target Axial Resolution (μm) | Image Drawing Evaluation Resolution of Wire Target Lateral Resolution (μm) |
|---|---|---|---|---|---|---|---|
| OBSERVATION EXAMPLE 1 | 4-14 (111%) | 4-18 | — | P1 | NO (FIRST IMAGE ONLY) | 161 (B) | 248 |
| | | | | P2 | | 168 (B) | 250 |
| | | | | P3 | | 171 (B) | 254 |
| | | | | P4 | | 175 (C) | 260 |

TABLE II-continued

| | | | | | | |
|---|---|---|---|---|---|---|
| OBSERVATION EXAMPLE 8 | 4-18 | 4-12 | P1 | (FIRST IMAGE) – [(FIRST IMAGE) – (SECOND IMAGE)] | 163 (B) | 244 |
| | | | P2 | | 170 (B) | 252 |
| | | | P3 | | 172 (B) | 254 |
| | | | P4 | | 176 (C) | 260 |

IMAGE DRAWING EVALUATION

| | HIGHEST BRIGHTNESS OF WIRE | MEAN BRIGHTNESS OF MATRIX | WIRE-MATRIX BRIGHTNESS DIFFERENCE | SCATTER AROUND WIRE TARGET |
|---|---|---|---|---|
| OBSERVATION EXAMPLE 1 | 156 | 4 | 152 (A) | — |
| | 160 | 13 | 137 (A) | NO |
| | 144 | 50 | 94 (A) | NO |
| | 137 | 78 | 58 (B) | NO |
| OBSERVATION EXAMPLE 8 | 153 | 3 | 150 (A) | — |
| | 147 | 13 | 134 (A) | NO |
| | 141 | 33 | 108 (A) | NO |
| | 133 | 42 | 91 (A) | HARDLY ANY |

As the ultrasound probe 2, the bandwidth of –20 dB band and the fractional bandwidth are shown. The –20 dB band is a band between the upper limit frequency and the lower limit frequency at –20 dB, wherein the maximum sensitivity is 0 dB in a relationship of sensitivity of the ultrasound probe 2 to frequency. The fractional bandwidth of the –20 dB band is a value [%] obtained by dividing the bandwidth of the –20 dB band by its center frequency. As the ultrasound probe 2, two types were used, one of which had a fractional bandwidth of the –20 dB band of 130% and the other of which had a fractional bandwidth of the –20 dB band of 111%.

The "Passband of Band-pass Filter (Lower Limit Frequency [MHz]—Upper Limit Frequency [MHz])" of the "Imaging Conditions" includes the passband of the band-pass filter of the imaging signal extractor 15a for the first imaging signal and the passband of the band-pass filter of the imaging signal extractor 15b for the second imaging signal. The "Phantom No. of Observation Target" is the number of each phantom observed in each observation example, which includes P1 to P4. The "Image Calculation" shows whether the sub-difference image data was generated, whether coefficient operation was performed and when performed, the coefficient value, and whether reduction was performed.

The "Image Drawing Evaluation" shows, about the observation examples 1 to 8, evaluation results of image drawing of the image data (first image data, sub-difference image data) obtained by using the diagnostic ultrasound apparatus 100A. The "Image Drawing Evaluation" includes: "Axial Resolution" and "Lateral Resolution" as "Resolution of Wire Target"; "Highest Brightness of Wire"; "Mean Brightness of Matrix"; "Wire-Matrix Brightness Difference"; and "Scatter around Wire Target". The "Axial Resolution" and "Lateral Resolution" show the axial resolution [μm] and the lateral resolution [μm] of the wire target in the image of the image data observed. The "Highest Brightness of Wire" shows the highest brightness of the wire target portion in the image. The "Mean Brightness of Matrix" shows the mean brightness of the matrix portion in the image. The "Wire-Matrix Brightness Difference" shows the brightness difference between the wire portion and the matrix portion in the image. The "Scatter around Wire Target" shows presence or absence of the scatter components around the wire target in the image.

In the observation example 1, the ultrasound probe 2 having a wide –20 dB band (4-19 MHz, fractional bandwidth: 130%) was used, and the passband of the band-pass filter of the imaging signal extractor 15a was wide (4-18 MHz) and imaging was performed by using reception signals being wide-band and containing high frequencies. Hence, regarding the phantom P1, both the axial resolution and the lateral resolution of the wire target were high. Regarding the phantoms P2, P3 and P4, although the resolutions slightly deteriorated (when compared with the phantom P1) owing to the reflection substance A and the scatter substances B, C around the wire, the deterioration was within 20% and excellent resolutions were maintained. However, regarding the phantoms P3 and P4, the brightness of the matrix increased owing to the scatter substances B, C, and the brightness difference between the wire target and the matrix became small, so that visibility of the wire target (relating to visibility of a puncture needle (needle visibility) in needling) deteriorated.

In the observation example 2, the ultrasound probe 2 having a wide –20 dB band was used, and the upper limit of the passband of the band-pass filter of the imaging signal extractor 15a was lower (4-12 MHz) than that in the observation example 1 and imaging was performed with high frequencies, which are much scattered by the scatter substances B, C, removed. Hence, the brightness difference between the wire target and the matrix being small, which was a problem in the observation example 1, lightened, so that the visibility of the wire target was secured. However, as compared with the observation example 1, the passband was narrower and the frequencies were lower, so that excellent resolutions were not obtained.

In the observation example 3, the ultrasound probe 2 having a wide –20 dB band was used; the passband of the band-pass filter of the imaging signal extractor 15a was wide (4-18 MHz) and the reception signal band contained high frequencies, so that the first image data was generated by imaging with the reception signals derived from the scatter substances included; the passband of the band-pass filter of the imaging signal extractor 15b did not contain high frequencies (4-12 MHz), so that the second image data was generated with few reception signals derived from the scatter substances B, C; the difference image components derived from the scatter substances B, C were extracted by subtracting the second image data from the first image data, and the image components derived from the scatter substances B, C in the first image data were removed by subtracting the extracted difference image components from the first image data. This decreased the matrix's brightness of the phantom P4, which simulated the subject under bad condition, while maintaining the resolutions of the wire target, and improved the brightness difference between the wire target and the matrix, which corresponds to needle visibility, of the phantom P4. However, because the wire target image in the second image data was worse in resolution and slightly larger than that in the first image data, images derived from the scatter substances B, C around the wire target were unable to be extracted from the first image data, and consequently regarding the phantom P4, the images derived from the scatter substances remained a little around the wire target.

In the observation example 4, as compared with the observation example 3, the passband of the band-pass filter of the imaging signal extractor 15b contained high frequencies less (4-8 MHz), so that the second image data was generated with more high-frequency components removed, and then the same processes as those in the observation example 3 were performed. Hence, a larger brightness difference between the wire target and the matrix was obtained. However, because, as compared with the phantom P4 in the observation example 3, the difference in the resolutions of the wire target between the first image data and the second image data became larger, regarding the phantom P4, the images derived from the scatter substances B, C around the wire target were recognized more, and the resolutions of the wire target slightly deteriorated accordingly.

In the observation example 5, the sub-difference image data was generated in the same manner as in the observation example 3 except that when the second image data was subtracted from the first image data, the brightness of the second image data was multiplied by a coefficient of 0.8 and then subtracted. This made the wire target image in the second image data smaller than that before multiplication by the coefficient, and solved the problem that the images derived from the scatter substances B, C around the wire target remained owing to the difference in the resolutions between the first image data and the second image data. Consequently, the image components derived from the scatter substances B, C including the wire target remained a little in the extracted image, and when the difference image data was subtracted from the first image data, the brightness of the wire target image slightly decreased, so that although the highest brightness of the wire target portion slightly decreased, a sufficient brightness difference was secured.

In the observation example 6, the sub-difference image data was generated in the same manner as in the observation example 3 except that when the second image data was subtracted from the first image data, the second image data was reduced by 20% by morphology processing and then subtracted. In the observation example 6, although the load of signal processing became somewhat high, the wire target image in the second image data became smaller than that before the reduction, which solved the problem that the images derived from the scatter substances B, C around the wire target remained owing to the difference in the resolutions between the first image data and the second image data.

In the observation example 7, the first image data was obtained in the same manner as in the observation example 1 except that instead of the ultrasound probe 2 having a wide −20 dB band used in the observation examples 1 to 6, the ultrasound probe 2 having a narrow −20 dB band (fractional bandwidth is small (111%)) was used. In the observation example 1, because the −20 dB band of the ultrasound probe 2 was up to 18 MHz, and imaging was performed by using the reception signals of the high-frequency region too, regarding the phantom P4, which contained a large amount of the scatter substances B, C, the mean brightness of the matrix portion was high. On the other hand, in the observation example 7, although the setting of the passband was unchanged, imaging was performed with few reception signals of the high-frequency region due to the band limit of the ultrasound probe 2, so that the mean brightness of the matrix portion was not as high as in the observation example 1. Hence, although the brightness difference between the wire target and the matrix, which relates to needle visibility, was better than that in the observation example 1, the resolutions of the wire target were obviously worse than those in the observation example 1 because the substantial reception signal band became a narrow band.

In the observation example 8, the difference image data was obtained in the same manner as in the observation example 3 except that instead of the ultrasound probe 2 having a wide −20 dB band used in the observation examples 1 to 6, the ultrasound probe 2 having a narrow −20 dB band was used. In the observation example 8, although the settings of the passband were unchanged, the first image data did not contain the high-frequency region much due to the band limit of the ultrasound probe 2, so that improvement of the brightness difference between the wire target and the matrix was smaller than that made by the observation example 3 from the observation example 1, and also the resolutions were worse than those in the observation example 3.

As understood from the observation examples 1 to 8, regarding the observation target being wide-band and containing high frequencies, thereby being excellent in the resolutions but having a large amount of the scatter substances, in the observation example 1, the brightness difference between the wire target and the matrix, which relates to needle visibility, was low, whereas in the observation examples 3 to 6, the resolutions and the brightness difference were compatible. In terms of drawing, the observation example 6 was the best, but the processing load was somewhat high. Hence, the sub-difference image data generating methods of the observation examples 3 to 5 may be used according to the region to observe and/or the purpose. A method may be automatically selected from these methods in accordance with preset selection, or may be selected therefrom by the user through the operation inputter 11 as appropriate. The same applies to the numeral values of the parameters, such as the multiplication coefficient and the reduction ratio.

Further, from the observation examples 7 and 8, it is understood that the first embodiment demonstrates higher effects by using the ultrasound probe 2 having a wide bandwidth (fractional bandwidth is large) and providing a difference in the substantial amount of high-frequency components between the first image data and the second image data. The first embodiment makes it possible to easily perform needling not only on the subject under excellent condition but also on the subject that is under bad condition and the image of which is poor and has low needle visibility conventionally, and also makes advanced techniques utilizing high resolution, such as medical fluid injection into between tissue membranes (e.g. between the epineurium 42 and the paraneural sheath 43 of the peripheral nerve 40), expectable.

As described above, according to the first embodiment and the example, the diagnostic ultrasound apparatus 100A includes: the sound ray signal generator 14 that generates a sound ray signal based on a reception signal(s) obtained from the ultrasound probe 2 that transmits and receives ultrasound to and from a subject; the imaging signal extractors 15a, 15b that extract a first imaging signal and a second imaging signal as a plurality of imaging signals from the sound ay signal by performing filtering of passing different bands, and the image calculator 17a that generates difference image data corresponding to a difference signal by using first image data and second image data corresponding to the first imaging signal and the second imaging signal, and performs an arithmetic operation on the first image data by using the difference image data. The image calculator 17a subtracts the difference image data corresponding to the difference signal from the first image data corresponding to the first imaging signal, thereby generating sub-difference image data corresponding to a sub-difference signal. The diagnostic ultrasound apparatus 100A includes the DSC 16 that generates the first image data and the second image data from the first imaging signal and the second imaging signal. The image calculator 17a generates the difference image data by using the first image data and the second image data, and subtracts the difference image data from the first image data.

Thus, the first image data corresponding to the first imaging signal makes it possible to draw reflectors of a tissue(s) with high resolution even when the subject has many scatterers in a tissue(s), and also suppress scattered acoustic noise by subtracting the difference image data from the first image data. That is, both high resolution and tissue recognition can be obtained. Hence, advanced needling for injecting a medical fluid into between membranes of a tissue can be performed.

Further, the image calculator 17a subtracts the difference image data from, of the first image data and the second image data, the first image data containing a high-frequency component(s). By subtracting the difference image data of many scatter components from the first image data having high resolution and containing many scatter components due to high-frequency components, the sub-difference image data having high resolution and containing few (or no) scatter components can be generated.

Further, the diagnostic ultrasound apparatus 100A includes the display image synthesizer 17c that combines the sub-difference image data and at least one of the first image data and the second image data, thereby generating combined image data. By displaying the sub-difference image data with at least one of the first image data and the second image data as the combined image data, the sub-difference image data can be visually confirmed more effectively.

Further, the image calculator 17a performs pre-processing on at least one of the first image data and the second image data, thereby generating pre-processed image data, and generates the difference image data by using at least the pre-processed image data. The pre-processing is multiplication by a coefficient. Hence, the sub-difference image data can be generated by matching a tissue region in the first image data with a tissue region in the difference image data.

Further, the coefficient has a value corresponding to a depth. Hence, the sub-difference image data can be generated by matching the tissue region in the first image data with the tissue region in the difference image data more accurately according to the depth.

Alternatively or additionally, the coefficient has a value corresponding to a region of the subject. Hence, the sub-difference image data can be generated by matching the tissue region in the first image data with the tissue region in the difference image data more accurately according to the region of the subject.

Alternatively or additionally, the coefficient has a value corresponding to a feature amount of the subject. Hence, the sub-difference image data can be generated by matching the tissue region in the first image data with the tissue region in the difference image data more accurately according to the feature amount of the subject adaptively.

Alternatively or additionally, the coefficient is input from a user through the operation inputter 11. Hence, the sub-difference image data can be generated by matching the tissue region in the first image data with the tissue region in the difference image data more accurately with the coefficient appropriately adjusted by the user.

The pre-processing is image reduction. Hence, the sub-difference image data can be generated by matching the tissue region in the first image data with the tissue region in the difference image data.

Alternatively or additionally, the pre-processing is filling of a gap(s) in an image. Hence, gaps in a region, thereby being discontinuous, in a tissue image in the second image data, which is used for generating the difference image data, can be filled, and continuity of the tissue image in the sub-difference image data can be secured.

Further, the fractional bandwidth of −20 dB band of the ultrasound probe 2 is 130% or more. This can enhance the effects of (i) high resolution of the sub-difference image data and (ii) tissue recognition in the sub-difference image data due to suppression of the scattered acoustic noise.

Further, the diagnostic ultrasound apparatus 100A includes the transmitter 12 that generates and outputs a drive signal containing fundamentals of different frequencies to the ultrasound probe 2, and the sound ray signal generator 14 generates the sound ray signal having harmonic components of the fundamentals. This can further enhance resolution of the image of the sub-difference image data.

Second Embodiment

Figure 10:
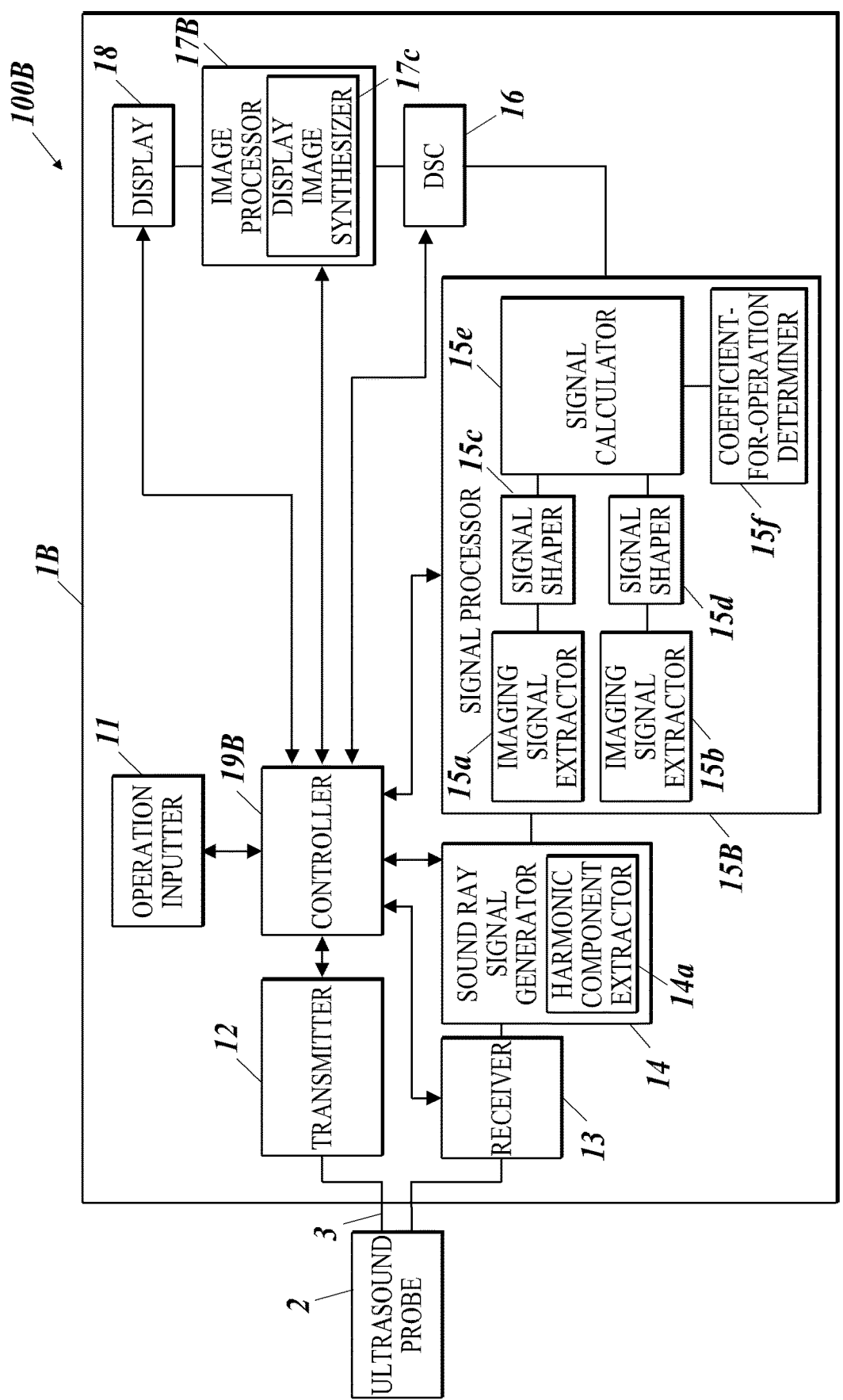
FIG. 10 is a block diagram showing the functional configuration of a diagnostic ultrasound apparatus according to a second embodiment of the present disclosure.
Figure 11:
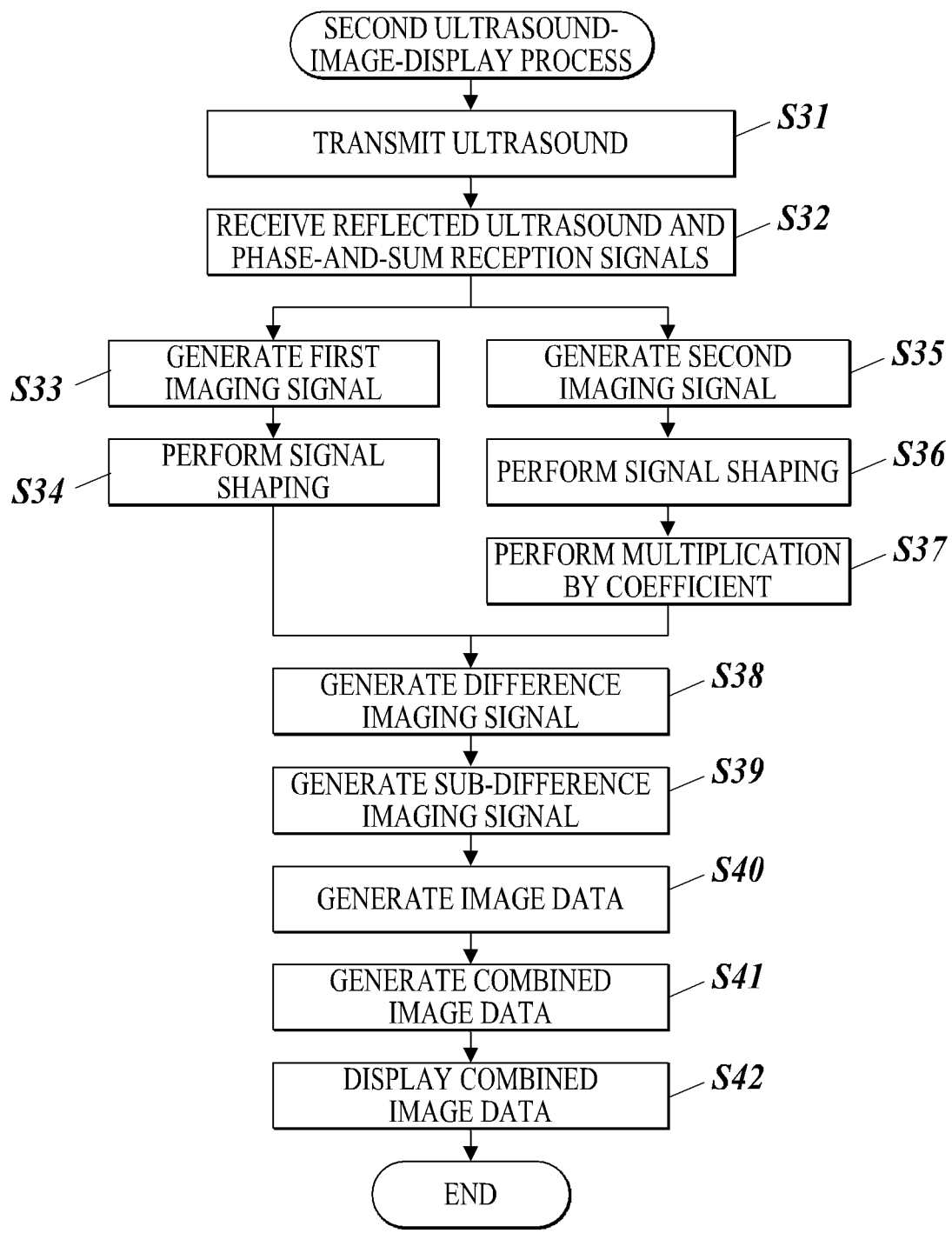
FIG. 11 is a flowchart showing a second ultrasound-image-display process.

A second embodiment of the present disclosure will be described with reference to FIG. 10 and FIG. 11. FIG. 10 is a block diagram showing the functional configuration of a diagnostic ultrasound apparatus 100B according to this embodiment. FIG. 11 is a flowchart showing a second-ultrasound-image display process.

In the first embodiment, the first and second image data are generated from the first and second imaging signals, and the sub-difference image data is generated from the first and second image data. However, in this embodiment, a sub-difference imaging signal is generated from the first and second imaging signals, and the sub-difference image data is generated therefrom.

The apparatus configuration of this embodiment will be described with reference to FIG. 10. In this embodiment, the diagnostic ultrasound apparatus 100B is used. Components of the diagnostic ultrasound apparatus 100B different from those of the diagnostic ultrasound apparatus 100A of the first embodiment are described mainly, and the same components are denoted by the same reference signs, and descriptions thereof are omitted.

As shown in FIG. 10, the diagnostic ultrasound apparatus 100B includes a main part 1B, an ultrasound probe 2 and a cable 3. The main part 1B includes an operation inputter 11, a transmitter 12, a receiver 13, a sound ray signal generator 14, a signal processor 15B, a DSC 16, an image processor 17B, a display 18 and a controller 19B (hardware processor).

The signal processor 15B includes imaging signal extractors 15a, 15b, signal shapers 15c, 15d, a signal calculator 15e (arithmetic unit) and a coefficient-for-operation determiner 15f. The image processor 17B includes a display image synthesizer 17c.

The signal calculator 15e is a circuit that, under the control of the controller 19B, subtracts the second imaging signal, which is input from the signal shaper 15d, from the first imaging signal, which is input from the signal shaper 15c, thereby generating the difference imaging signal, and subtracts the generated difference imaging signal from the first imaging signal, thereby generating the sub-difference imaging signal.

The signal calculator 15e may, as coefficient operation, multiply, for example, the second imaging signal by a coefficient, the coefficient being obtained from the coefficient-for-operation determiner 15f, and then subtract the second imaging signal multiplied by the coefficient from the first imaging signal, thereby generating the difference imaging signal. The coefficient-for-operation determiner 15f determines and outputs, under the control of the controller 19A, the coefficient for difference imaging signal to the signal calculator 15e. The coefficient-for-operation determiner 15f determines the coefficient in the same manner as the coefficient-for-operation determiner 17b.

Similarly to the image calculator 17a of the first embodiment, the signal calculator 15e may perform pre-processing other than coefficient operation on at least one of the first imaging signal and the second imaging signal.

The DSC 16 performs, under the control of the controller 19B, dynamic range adjustment and/or gain adjustment on the first imaging signal, the second imaging signal and the difference imaging signal input from the signal processor 15B (signal calculator 15e) to perform brightness conversion, and performs coordinate conversion or the like, thereby generating first image data, second image data and difference image data as B-mode image data for display.

The display image synthesizer 17c generates, under the control of the controller 19B, in response to, for example, an operation input made by the user through the operation inputter 11, combined image data for parallel display of the sub-difference image data and the first or second image data input from the DSC 16, or colors the sub-difference image data and generates combined image data of the colored sub-difference image data and the first or second image data, and then outputs a display signal(s) of the generated combined image data to the display 18.

The controller 19B controls each component of the diagnostic ultrasound apparatus 100B in the same manner as the controller 19A of the first embodiment, but the ROM stores, instead of the first ultrasound-image-display program, a second ultrasound-image-display program for the below-described second ultrasound-image-display process.

Next, operation of the diagnostic ultrasound apparatus 100B will be described with reference to FIG. 11. In the diagnostic ultrasound apparatus 100B, for example, the controller 19B performs the second ultrasound-image-display process in accordance with the second ultrasound-image-display program stored in the ROM in response to, as a trigger, an instruction to perform the second ultrasound-image-display process input by the user through the operation inputter 11.

As shown in FIG. 11, Steps S31 to S36 are the same as Steps S11 to S14, S16 and S17 of the first ultrasound-image-display process of the first embodiment. After Step S36, the controller 19B causes the signal calculator 15e to obtain a coefficient manually or automatically determined from the coefficient preset by the coefficient-for-operation determiner 15f and multiply the envelope-detected and log-compressed second imaging signal generated in Step S36 by the obtained coefficient (Step S37). In Step S37, the coefficient may not be multiplied.

Next, the controller 19B causes the signal calculator 15e to subtract the coefficient-multiplied or no-coefficient-multiplied second imaging signal generated in Step S37 from the envelope-detected and log-compressed first imaging signal generated in Step S34, thereby generating difference imaging signal (Step S38). Next, the controller 19B causes the signal calculator 15e to subtract the difference imaging signal generated in Step S38 from the envelope-detected and log-compressed first imaging signal generated in Step S34, thereby generating sub-difference imaging signal (Step S39).

Next, the controller 19B causes the DSC 16 to generate first image data, second image data and sub-difference image data from the envelope-detected and log-compressed first imaging signal generated in Step S34, the coefficient-multiplied or no-coefficient-multiplied second imaging signal generated in Step S37 and the sub-difference imaging signal generated in Step S39 (Step S40). Steps S41 and S42 are the same as Steps S22 and S23 of the first ultrasound-image-display process.

As described above, according to the second embodiment, the diagnostic ultrasound apparatus 100B includes: the sound ray signal generator 14 that generates a sound ray signal based on a reception signal(s) obtained from the ultrasound probe 2 that transmits and receives ultrasound to and from a subject; the imaging signal extractors 15a, 15b that extract a first imaging signal and a second imaging signal as a plurality of imaging signals from the sound ray signal by performing filtering of passing different bands; and the signal calculator 15e that generates a difference imaging signal by using the first imaging signal and the second imaging signal, and performs an arithmetic operation on the first imaging signal by using the difference imaging signal. The signal calculator 15e subtracts the difference imaging signal from the first imaging signal, thereby generating a sub-difference imaging signal. The diagnostic ultrasound apparatus 100B includes the DSC 16 that generates sub-difference image data from the sub-difference imaging signal.

Thus, as with the first embodiment, the first imaging signal makes it possible to draw reflectors of a tissue(s) with high resolution even when the subject has many scatterers in a tissue(s), and also suppress scattered acoustic noise by subtracting the difference imaging signal from the first imaging signal. That is, both high resolution and tissue recognition can be obtained.

Those described in the above embodiments and example are preferred examples (instances) of the diagnostic ultrasound apparatus of the present disclosure, and not intended to limit the present invention. For example, in the first and second embodiments, the processes that are performed by the signal processors 15A, 15B and the image processors 17A, 17B may be performed in units of frames or in units of sound rays.

Further, in the first and second embodiments, the imaging signal extractors 15a, 15b generate the first imaging signal and the second imaging signal, but not limited thereto. For example, a method may be used in which the high-frequency removing step in the signal processor has multiple stages, and third and fourth imaging signals are obtained in addition to the first and second imaging signals, and differences between these imaging signals are utilized.

Further, in the first and second embodiments, the diagnostic ultrasound apparatuses 100A, 100B are configured for the harmonic imaging mode with pulse inversion, and the transmitter 12 generates drive signals for pulse inversion, and the sound ray signal generator 14 generates sound ray signals for B-mode images for pulse inversion, but not limited thereto. The diagnostic ultrasound apparatuses may be configured for the harmonic imaging mode with not pluse inversion but so-called filtering for harmonic extraction, and the transmitter 12 generates normal drive signals, and the sound ray signal generator 14 generates sound ray signals for B-mode images, or may be configured for the fundamental imaging mode without harmonic extraction.

Further, the detailed configuration and detailed operation of each component of the ultrasound diagnosis apparatuses 100A, 100B in the above first and second embodiments can be appropriately modified within a range not departing from the scope of the present disclosure.

Although one or more embodiments of the present invention have been described and illustrated in detail, the disclosed embodiments are made for purposes of not limitation but illustration and example only. The scope of the present invention should be interpreted by terms of the appended claims.

What is claimed is:

1. A diagnostic ultrasound apparatus comprising:
   a sound ray signal generator that generates a sound ray signal based on a reception signal obtained from an ultrasound probe that transmits and receives ultrasound to and from a subject;
   an extractor that extracts imaging signals from the sound ray signal by performing filtering of passing different bands, the imaging signals including a first imaging signal and a second imaging signal, the first imaging signal containing high frequency components and being a wide band and the second imaging signal overlaps the wide band of the first imaging signal and does not contain the high frequency components; and
   an arithmetic unit that generates a difference signal by subtracting the second imaging signal from the first imaging signal, and performs an arithmetic operation on the first imaging signal by using the difference signal.

2. The diagnostic ultrasound apparatus according to claim 1, wherein the arithmetic unit subtracts the difference signal from the the first imaging signal, thereby generating a sub-difference signal.

3. The diagnostic ultrasound apparatus according to claim 2, further comprising an image data generator that generates sub-difference image data from the sub-difference signal.

4. The diagnostic ultrasound apparatus according to claim 2, further comprising an image data generator that generates plural image data from the imaging signals,
   wherein the arithmetic unit generates difference image data by using the plural image data, and subtracts the difference image data from at least one of the plural image data, thereby generating sub-difference image data.

5. The diagnostic ultrasound apparatus according to claim 3, wherein the sub-difference image data and at least one of plural image data corresponding to the imaging signals are combined, whereby combined image data is generated.

6. The diagnostic ultrasound apparatus according to claim 1, wherein the arithmetic unit:
   performs pre-processing on the first imaging signal before the difference signal is generated.

7. The diagnostic ultrasound apparatus according to claim 6, wherein the pre-processing is multiplication by a coefficient.

8. The diagnostic ultrasound apparatus according to claim 7, wherein the coefficient has a value corresponding to a depth.

9. The diagnostic ultrasound apparatus according to claim 7, wherein the coefficient has a value corresponding to a region of the subject.

10. The diagnostic ultrasound apparatus according to claim 7, wherein the coefficient has a value corresponding to a feature amount of the subject.

11. The diagnostic ultrasound apparatus according to claim 7, wherein the coefficient is input through an operation inputter.

12. The diagnostic ultrasound apparatus according to claim 6, wherein the pre-processing is image reduction.

13. The diagnostic ultrasound apparatus according to claim 6, wherein the pre-processing is filling of a gap in an image.

14. The diagnostic ultrasound apparatus according to claim 1, wherein a fractional bandwidth of −20 dB band of the ultrasound probe is 130% or more.

15. The diagnostic ultrasound apparatus according to claim 1, further comprising a transmitter that generates and outputs a drive signal containing fundamentals of different frequencies to the ultrasound probe,
    wherein the sound ray signal generator generates the sound ray signal having harmonic components of the fundamentals.

16. A non-transitory computer readable storage medium storing a program that causes a computer to:
    generate a sound ray signal based on a reception signal obtained from an ultrasound probe that transmits and receives ultrasound to and from a subject;
    extract imaging signals from the sound ray signal by performing filtering of passing different bands, the imaging signals including a first imaging signal and a second imaging signal, the first imaging signal containing high frequency components and being a wide band and the second imaging signal overlaps the wide band of the first imaging signal and does not contain the high frequency components; and
    generate a difference signal by subtracting the second imaging signal from the first imaging signal, and perform an arithmetic operation on the first imaging signal using the difference signal.

17. The diagnostic ultrasound apparatus according to claim 1, wherein the difference signal is a signal that does not contain reflection components and contains scatter components, the arithmetic unit generates a sub-difference signal using the first imaging signal and the difference signal, and the sub-difference signal suppresses the scatter components.

* * * * *